US012625111B2

(12) United States Patent
Itou

(10) Patent No.: US 12,625,111 B2
(45) Date of Patent: May 12, 2026

(54) MEASUREMENT APPARATUS AND MEASUREMENT METHOD

(71) Applicant: Yokogawa Electric Corporation, Musashino (JP)

(72) Inventor: Rai Itou, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 18/367,585

(22) Filed: Sep. 13, 2023

(65) Prior Publication Data

US 2024/0085377 A1     Mar. 14, 2024

(30) Foreign Application Priority Data

Sep. 14, 2022    (JP) ................................. 2022-146571
Aug. 28, 2023    (JP) ................................. 2023-138393

(51) Int. Cl.
| | |
|---|---|
| *G01N 29/024* | (2006.01) |
| *G01F 23/296* | (2022.01) |
| *G01N 1/38* | (2006.01) |
| *G01N 29/032* | (2006.01) |
| *G01N 29/44* | (2006.01) |

(52) U.S. Cl.
CPC ............. *G01N 29/024* (2013.01); *G01N 1/38* (2013.01); *G01F 23/296* (2013.01); *G01N 29/032* (2013.01); *G01N 29/4436* (2013.01); *G01N 2291/011* (2013.01); *G01N 2291/022* (2013.01); *G01N 2291/02416* (2013.01); *G01N 2291/02433* (2013.01)

(58) Field of Classification Search
CPC ................... G01N 29/024; G01N 1/38; G01N 2291/011; G01N 2291/022; G01N 29/4436; G01N 23/296; G01N 2291/02416; G01N 2291/02433; G01N 29/032; G01F 23/296
USPC ......................................................... 73/597
See application file for complete search history.

(56) References Cited

U.S. PATENT DOCUMENTS

| | | |
|---|---|---|
| 4,726,221 A | 2/1988 | Tavlarides et al. |
| 6,959,589 B1 | 11/2005 | Soong et al. |
| (Continued) | | |

FOREIGN PATENT DOCUMENTS

| | | |
|---|---|---|
| JP | S63-103962 A | 5/1988 |
| JP | H09-22103 A | 1/1997 |
| (Continued) | | |

OTHER PUBLICATIONS

Extended (Supplementary) European Search Report dated Feb. 2, 2024, issued in counterpart EP Application No. 23197502.0. (8 pages).

(Continued)

*Primary Examiner* — Peter J Macchiarolo
*Assistant Examiner* — John M Royston
(74) *Attorney, Agent, or Firm* — WHDA, LLP

(57) ABSTRACT

A measurement apparatus 1 disposed with respect to a container 105 containing a liquid L. The measurement apparatus 1 includes output detectors fixed to the container 105 that output ultrasonic waves that propagate in the liquid L in the container 105 and detect the ultrasonic waves propagated in the liquid L. The measurement apparatus 1 also includes a controller 50 that measures a state of the liquid L in the container 105 based on the ultrasonic waves detected by the output detectors.

11 Claims, 25 Drawing Sheets

(56) References Cited

U.S. PATENT DOCUMENTS

| | | | |
|---|---|---|---|
| 7,140,239 | B2 | 11/2006 | Greenwood et al. |
| 8,850,882 | B2 | 10/2014 | Qu et al. |
| 10,794,865 | B2 | 10/2020 | Sinha et al. |
| 2004/0139792 | A1 | 7/2004 | Cobb |
| 2008/0066551 | A1* | 3/2008 | Panetta ................ G01N 29/032 |
| | | | 73/584 |
| 2011/0094299 | A1* | 4/2011 | Muller .................... G01F 23/28 |
| | | | 73/290 V |
| 2014/0163889 | A1* | 6/2014 | Finfer ................... E21B 47/107 |
| | | | 702/11 |
| 2014/0272938 | A1* | 9/2014 | Loo .......................... C12Q 1/04 |
| | | | 435/7.1 |
| 2014/0366626 | A1* | 12/2014 | Kuroda ................ G21C 17/035 |
| | | | 73/290 V |
| 2017/0343397 | A1* | 11/2017 | Ye ............................ G01F 1/66 |
| 2021/0140927 | A1* | 5/2021 | Kassubek ............. G01N 29/30 |
| 2021/0205772 | A1 | 7/2021 | Bernhard et al. |
| 2022/0276116 | A1* | 9/2022 | Sadovnychiy ......... G08C 17/02 |

FOREIGN PATENT DOCUMENTS

| | | |
|---|---|---|
| JP | H09-171005 A | 6/1997 |
| JP | 2010-276593 A | 12/2010 |
| JP | 2013-073906 A | 4/2013 |
| JP | 2021-137196 A | 9/2021 |

OTHER PUBLICATIONS

Office Action dated Jun. 30, 2025, issued in counterpart EP Application No. 23197502.0 (6 pages).

Oral Proceedings dated Jan. 15, 2026, issued in counterpart EP Application No. 23197502.0. (8 pages).

Office Action dated Mar. 31, 2026, issued in counterpart JP Application No. 2023-138393, with English translation. (8 pages).

* cited by examiner

START

RECEIVE OBJECT — S100

START STIRRING OPERATION — S101

SELECT PAIR OF OUTPUT AND DETECTOR — S102

OUTPUT ULTRASONIC WAVE — S103

DETECT ULTRASONIC WAVE — S104

STORE DETECTION SIGNAL — S105

S106
DETECTION PERFORMED USING ALL DETECTORS?  — No

Yes

MEASURE STATE OF LIQUID — S107

S108
STIRRING COMPLETE? — No

Yes

DISPLAY RESULT — S109

END STIRRING OPERATION — S110

END

MEASUREMENT APPARATUS AND MEASUREMENT METHOD

CROSS-REFERENCE TO RELATED APPLICATION

The present application claims priority to and the benefit of Japanese Patent Application No. 2022-146571 filed Sep. 14, 2022 and Japanese Patent Application No. 2023-138393 filed Aug. 28, 2023, the entire contents of which are incorporated herein by reference.

TECHNICAL FIELD

The present disclosure relates to a measurement apparatus and a measurement method.

BACKGROUND

Technology related to stirring for mixing objects in liquids is conventionally known. For example, Patent Literature (PTL) 1 describes a thickening support system and a stirrer that facilitate achieving a desired thickening.

CITATION LIST

Patent Literature

PTL 1: JP 2021-137196 A

SUMMARY

A measurement apparatus according to at least one embodiment is a measurement apparatus disposed with respect to a container containing a liquid, the measurement apparatus comprising: output detectors fixed to the container, the output detectors being configured to output ultrasonic waves that propagate in the liquid in the container and detect the ultrasonic waves propagated in the liquid; and a controller configured to measure a state of the liquid in the container based on the ultrasonic waves detected by the output detectors.

BRIEF DESCRIPTION OF THE DRAWINGS

In the accompanying drawings:

FIG. 16 is a schematic diagram illustrating Variation 1 of the measurement apparatus illustrated in FIG. 1;

FIG. 19 is a schematic diagram illustrating Variation 4 of the measurement apparatus illustrated in FIG. 1;

FIG. 20 is a schematic diagram illustrating Variation 5 of the measurement apparatus illustrated in FIG. 1;

DETAILED DESCRIPTION

Figure 1:
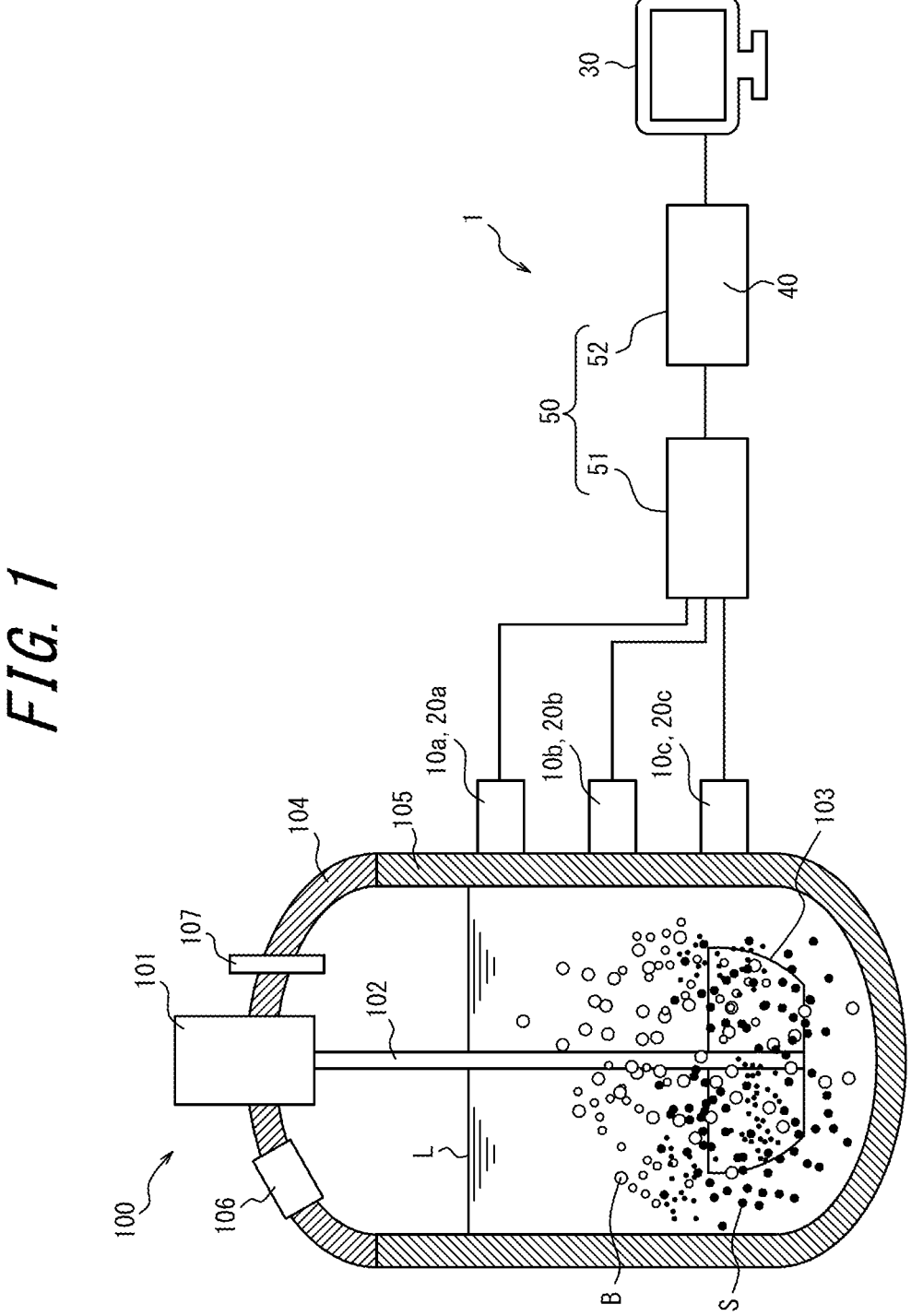
FIG. 1 is a schematic diagram illustrating a schematic configuration of a measurement apparatus according to an embodiment of the present disclosure.

However, conventional technology has not adequately considered the point of quantitatively measuring the state of a liquid used in stirring and the like by sensing other than sensing a specific physical quantity, during stirring in the container, and without opening a lid of a container.

It would be helpful to provide a measurement apparatus and a measurement method able to more easily measure the state of a liquid.

A measurement apparatus according to at least one embodiment is a measurement apparatus disposed with respect to a container containing a liquid, the measurement apparatus comprising: output detectors fixed to the container, the output detectors being configured to output ultrasonic waves that propagate in the liquid in the container and detect the ultrasonic waves propagated in the liquid; and a controller configured to measure a state of the liquid in the container based on the ultrasonic waves detected by the output detectors.

Accordingly, the state of the liquid used in stirring, for example, may be more easily measured, even during stirring. The measurement apparatus is able to quantitatively measure the state of the liquid used in stirring by sensing other than sensing a specific physical quantity, during stirring in the container, and without opening the lid of the container. The measurement apparatus is able to measure the state of the liquid in real time, even during stirring, without removing the liquid in a stirrer. This improves the convenience of the measurement apparatus when measuring the state of the liquid used in stirring in the container of the stirrer.

In the measurement apparatus according to an embodiment, the container containing the liquid is for stirring an object in the liquid, the state of the liquid includes a product state of the liquid in stirring, and the controller is configured to measure the product state of the liquid based on reference data regarding the product state of the liquid in a first reference state and measurement data regarding the product state of the liquid in stirring.

Accordingly, the measurement apparatus is able to more easily measure the product state of the liquid in stirring, even during stirring. The measurement apparatus is able to easily check the product state of the liquid in stirring by quantitatively determining the product state of the liquid in stirring without using a unique formula to measure a specific physical quantity in the real time measurement described above. Therefore, a similar effect is achieved to that described above, of improvement in convenience of the measurement apparatus.

In the measurement apparatus according to an embodiment, the controller is configured to calculate a difference of the measurement data from the reference data and determine that the stirring of the object with respect to the liquid is complete when the difference is constant over a defined time.

Accordingly, the measurement apparatus is able to quantitatively determine that the object has been successfully mixed with respect to the liquid. The measurement apparatus is able to quantitatively determine that the stirring is complete without opening the lid of the container. The measurement apparatus is able to determine, in real time, that the stirring is complete without removing the liquid in the stirrer. Therefore, a similar effect is achieved to that described above, of improvement in convenience of the measurement apparatus.

In the measurement apparatus according to an embodiment, the state of the liquid includes a position of a liquid surface of the liquid in the container, and the controller is configured to measure the position of the liquid surface of the liquid based on detection signals of the ultrasonic waves detected by the output detectors.

Accordingly, the measurement apparatus is able to more easily measure the position of the liquid surface, even during stirring. The measurement apparatus is able to easily measure the position of the liquid surface without opening the lid of the container during stirring in the container. The measurement apparatus is able to measure the position of the liquid surface in real time, even during stirring, without opening the lid. Therefore, a similar effect is achieved to that described above, of improvement in convenience of the measurement apparatus.

In the measurement apparatus according to an embodiment, the controller is configured to calculate a position between one of the output detectors that indicates a first detection signal and another adjacent one of the output detectors that indicates a second detection signal different from the first detection signal as the position of the liquid surface of the liquid.

Accordingly, the measurement apparatus is able to more easily measure the position of the liquid surface of the liquid, even during stirring, based on the detection signals obtained by the output detectors. Therefore, a similar effect is achieved to that described above, of improvement in convenience of the measurement apparatus.

In the measurement apparatus according to an embodiment, the state of the liquid includes the presence or absence of bubbles or particles, and the controller is configured to measure the presence or absence of bubbles or particles based on at least one of a positive or negative beginning of a waveform and speed of sound of an ultrasonic wave detected by the output detectors.

Accordingly, the measurement apparatus is able to more easily measure the presence or absence of bubbles or particles, even during stirring. The measurement apparatus is able to easily measure the presence or absence of bubbles or particles without opening the lid of the container during stirring in the container. The measurement apparatus is able to measure the presence or absence of bubbles or particles in real time, even during stirring, without opening the lid. Therefore, a similar effect is achieved to that described above, of improvement in convenience of the measurement apparatus.

In the measurement apparatus according to an embodiment, the controller is configured to determine that bubbles are present when the positive or negative beginning of the waveform while the liquid is in use is inverted relative to the positive or negative beginning of a reference waveform while the liquid is in a second reference state.

Accordingly, the measurement apparatus is able to objectively measure the presence or absence of bubbles based on waveform shape changes. Therefore, a similar effect is achieved to that described above, of improvement in convenience of the measurement apparatus.

In the measurement apparatus according to an embodiment, the state of the liquid includes density of bubbles or particles, and the controller is configured to measure the density of bubbles or particles based on the speed of sound of an ultrasonic wave detected by the output detectors.

Accordingly, the measurement apparatus is able to more easily measure the density of bubbles or particles, even during stirring. The measurement apparatus is able to easily measure the density of bubbles or particles without opening the lid of the container during stirring in the container. The measurement apparatus is able to measure the density of bubbles or particles in real time, even during stirring, without opening the lid. Therefore, a similar effect is achieved to that described above, of improvement in convenience of the measurement apparatus.

In the measurement apparatus according to an embodiment, the output detectors are disposed along an outer surface of the container, and the output detectors are configured to detect a reflected or transmitted wave of the ultrasonic wave output.

Accordingly, the measurement apparatus is able to easily measure the state of the liquid being stirred from outside the stirrer. The measurement apparatus is able to easily measure the state of the liquid from outside, without opening the lid of the container during stirring in the container. The measurement apparatus is able to measure the state of the liquid from outside in real time, even during stirring, without opening the lid. Therefore, a similar effect is achieved to that described above, of improvement in convenience of the measurement apparatus.

In the measurement apparatus according to an embodiment, the output detectors include a homogenizer that uses the ultrasonic waves to disintegrate and disperse the object in the liquid, and the output detectors detect the ultrasonic waves from the homogenizer.

Accordingly, the measurement apparatus is able to measure the state of the liquid based on the same principle as the measurement method described below, using the ultrasonic waves from the homogenizer that propagate in the liquid.

In the measurement apparatus according to an embodiment, the controller further measures at least one of the viscosity of the liquid in the container, the pressure of the liquid in the container, the temperature of the liquid in the container, or the appearance of the liquid in the container.

Accordingly, the measurement apparatus is able to combine multiple physical quantities and obtain correlations, thereby defining with greater accuracy the state of the liquid, for example, the product state of the liquid. For example, the measurement apparatus may determine that the liquid has a defined state in a defined time range, and therefore that stirring of the object in the liquid is complete.

A measurement method according to at least one embodiment is a measurement method performed by a measurement apparatus disposed with respect to a container containing a liquid, the measurement method comprising: outputting ultrasonic waves that propagate in the liquid in the container; detecting, at a fixed position relative to the container, the ultrasonic waves propagated in the liquid; and measuring a state of the liquid in the container based on the ultrasonic waves detected.

Accordingly, the state of the liquid used in stirring, for example, may be more easily measured, even during stirring. The measurement apparatus is able to quantitatively measure the state of the liquid used in stirring by sensing other than sensing a specific physical quantity, during stirring in the container, and without opening the lid of the container. The measurement apparatus is able to measure the state of the liquid in real time, even during stirring, without removing the liquid in a stirrer. This improves the convenience of the measurement apparatus when measuring the state of the liquid used in stirring in the container of the stirrer.

According to the present disclosure, a measurement apparatus and a measurement method are provided that more easily measure a state of a liquid.

Background and problems of conventional technology are described in more detail.

A stirrer used to mix an object into a liquid has, as main components, a motor, a stirring shaft, stirrer blades, a lid, and a container. The container of the stirrer contains a mixture of the liquid as a main agent and the object to be dispersed in the liquid by stirring. The stirrer transmits rotational force from rotation of the motor to the stirrer blades via the stirring shaft, and mixes the object with the liquid by rotating the stirrer blades. Depending on the object, bubbles may be introduced by stirring. The stirrer may include a sight glass and a measurement instrument such as a thermometer, a pressure gauge, and the like installed with respect to the lid to allow a state inside the container to be checked.

Several possible methods may be considered to check whether the object is completely mixed with the liquid as the main agent. A first method is to stir for a preset time. A second method is to open the lid of the container and remove the liquid therein to check. A third method is to view the liquid in the container through the sight glass from outside the container. A fourth method is to measure the motor rotation speed and current consumption to determine whether stirring torque has reached a defined torque. A fifth method is to determine based on secondary information from inside the container, such as temperature, pressure, and the like measured by a measurement instrument.

However, none of these methods made measuring the state of the liquid from outside the container easy during stirring. For example, to check a product state of the liquid in stirring, it was necessary to stop stirring once, open the lid of the container, obtain the liquid inside the container with a ladle, and check with an external instrument. For example, according to the fourth method above, checking the product state during stirring is possible to a point, but depending on the object, the stirring torque might not change.

In addition, stirring may cause density differences in precipitate in the container and differences in the state of bubble mixing. As a result, a problem occurs that the product state of the liquid in stirring is not stable. To measure these factors, multiple detectors need to be installed.

Further, depending on stirring conditions, the position of the liquid surface inside may rise, which could dirty a sight glass on an upper surface of the lid, and could cause an attached measurement instrument, such as a thermometer, pressure gauge, and the like, to fail. Therefore, measuring the position of the liquid surface as a state of the liquid is also important, but the method of visualization from a sight glass is typically used.

In order to solve the above problems, it would be helpful to provide a measurement apparatus and a measurement method able to more easily measure the state of a liquid used in stirring, even during stirring. More specifically, it would be helpful to provide technology able to measure the state of a liquid used in stirring from outside a container without opening a lid of the container during stirring in the container, and able to quantitatively measure by sensing other than sensing a specific physical quantity.

(Configuration)

An embodiment of the present disclosure is described below, with reference to the accompanying drawings.

Figure 2:
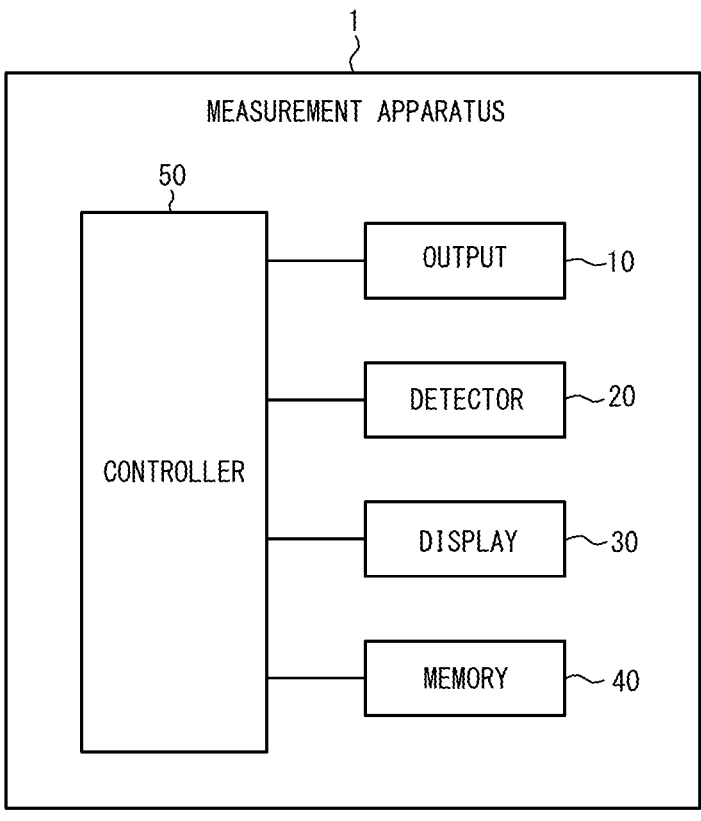
FIG. 2 is a functional block diagram illustrating a schematic configuration of the measurement apparatus illustrated in FIG. 1.

FIG. 1 is a schematic diagram illustrating a schematic configuration of a measurement apparatus 1 according to the embodiment of the present disclosure. FIG. 2 is a functional block diagram illustrating a schematic configuration of the measurement apparatus 1 illustrated in FIG. 1. First, the configuration of a stirrer 100 used to stir an object S in a liquid L is described, with reference to FIG. 1. In the present disclosure, the "object S" includes, for example, solids, liquids, gases, and the like in any state.

The stirrer 100 includes a motor 101, a stirring shaft 102, a stirrer blade 103, a lid 104, and a container 105. The liquid L as the main agent and the object S to be dispersed in the liquid L by stirring are mixed in the container 105. The container 105 stores the liquid L. The stirrer 100 transmits rotational force from rotation of the motor 101 to the stirrer blade 103 via the stirring shaft 102, and mixes the object S with the liquid L by rotation of the stirrer blade 103. Depending on the object S, bubbles B may be mixed in by the stirring.

The stirrer 100 may additionally include a sight glass 106 and a measurement instrument 107 such as a thermometer, a pressure gauge, and the like at the lid 104 to allow a state inside the container 105 to be checked.

The configuration of the measurement apparatus 1 disposed with respect to the stirrer 100 is described, with reference to FIG. 1 and FIG. 2. The measurement apparatus 1 includes outputs 10, detectors 20, a display 30, a memory 40, and a controller 50. In the example illustrated in FIG. 1, each one of the outputs 10 and each one of the detectors 20 may be used together as one module and integrally configured as one output detector. Each one of the outputs 10 and each one of the detectors 20 may be combined into one output detector as a module configuration, but may be defined as separate functional blocks in terms of function. One output detector includes one of the outputs and one of the detectors 20. The output detectors are fixed to the container 105.

Each of the outputs 10 includes any ultrasonic wave output module that is fixed to the container 105. Each of the outputs 10 outputs an ultrasonic wave that propagates in the liquid L stored in the container 105. Each of the outputs 10 outputs an ultrasonic wave when a control signal, such as a square wave, a sine wave, a triangular wave, and the like, is applied from the controller 50.

Each of the detectors 20 includes any ultrasonic wave detection module that is fixed to the container 105. Each of the detectors 20 detects an ultrasonic wave output from the outputs 10 and propagated in the liquid L stored in the container 105.

The display 30 includes one or more output interfaces that output information to notify a user. For example, the display 30 includes a display that outputs information in the form of images.

The memory 40 includes any memory module, including a hard disk drive (HDD), a solid-state drive (SSD), electrically erasable programmable read-only memory (EEPROM), read-only memory (ROM), random access memory (RAM), and the like. The memory 40 functions, for example, as a main memory, auxiliary memory, or cache memory. The memory 40 is not limited to being built into the measurement apparatus 1, and may include an external storage module connected by a digital input/output port such as Universal Serial Bus (USB). The memory 40 stores any information used in operation of the measurement apparatus 1.

The controller 50 includes at least one processor. According to the present embodiment, a "processor" may be, but is not limited to, a general-purpose processor or a dedicated processor specialized for particular processing. The controller 50 measures the state of the liquid L used in stirring in the container 105 based on ultrasonic waves detected by the detectors 20.

In the present disclosure, the "state of the liquid L" includes, for example, a product state of the liquid L in stirring, the position of the liquid surface of the liquid L in the container 105, the presence or absence of the bubbles B or particles based on the object S or the like, the density the bubbles B or the particles based on the object S or the like, density of the liquid L being stirred, viscosity of the liquid L, and the like. Here, "product state" includes, for example, a degree of mixing of the object S with the liquid L, and the like.

Referring to FIG. 1, the measurement apparatus 1 is disposed with respect to the container 105 used for stirring of the object S in the liquid L. The pairs of the outputs 10 and the detectors 20 of the measurement apparatus 1 are disposed along an outer surface of the container 105. The measurement apparatus 1 includes, for example, three pairs of the outputs 10 and the detectors 20. An output 10a and a detector 20a are disposed at an upper level along the outer surface of the container 105. An output 10b and a detector 20b are disposed at a middle level along the outer surface of the container 105. An output 10c and a detector 20c are disposed at a lower level along the outer surface of the container 105.

The controller 50 includes control circuitry 51 that controls operation of the pairs of the outputs 10 and the detectors 20. The control circuitry 51 controls output of ultrasonic waves by the outputs 10. The control circuitry 51 controls detection of ultrasonic waves by the detectors 20. The controller 50 includes an information processing terminal 52 connected to the control circuitry 51. The information processing terminal 52 is a general-purpose electronic device, such as a personal computer (PC), tablet PC, smartphone, and the like, or any other small device capable of wireless transmission.

Each of the pairs of the outputs 10 and the detectors 20 output and detect ultrasonic waves based on control by the controller 50. Ultrasonic waves are generated by the control circuitry 51 transmitting control signals to the outputs 10 to output ultrasonic waves, which then propagate through the interior of the container 105. Propagated ultrasonic waves are reflected at a wall of the container 105. When the liquid L is stored in the container 105, ultrasonic waves propagate through the liquid L and are reflected at the stirrer blade 103, the stirring shaft 102, and an opposite inner wall of the container 105. In addition, ultrasonic waves incident on the liquid L are reflected at the object S and the bubbles B dispersed in the liquid L.

The detectors 20 detect reflected waves of ultrasonic waves output from the paired outputs 10. The control circuitry 51 controls the detection of ultrasonic waves for each of the detectors 20. That is, a detection signal of an ultrasonic wave is obtained for each of the detectors 20.

A defined spacing is provided between the pairs of the outputs 10 and the detectors 20 fixed along the outer surface of the container 105. The memory 40 positioned at the information processing terminal 52 stores the defined spacing.

Figure 3A:
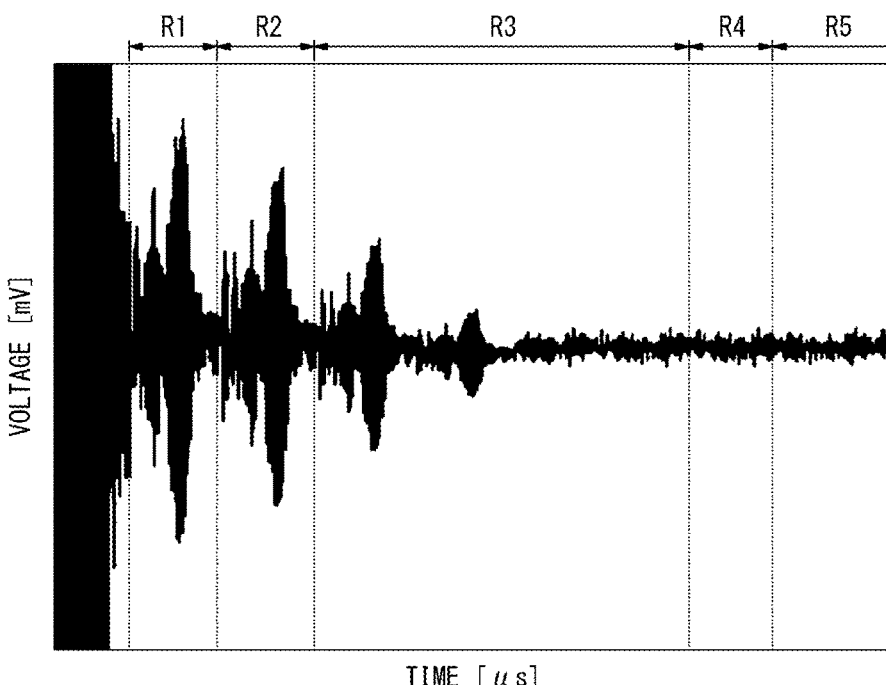
FIG. 3A is a graph illustrating example 1 of a detection signal from a detector.

The information processing terminal 52 obtains the detection signals of ultrasonic waves from the control circuitry 51 and measures the state of the liquid L used in stirring in the container 105. The information processing terminal 52 outputs a measurement result as data via the display 30. In other words, the measurement result is displayed on the display 30, for example. FIG. 3A is a graph illustrating example 1 of a detection signal from one of the detectors 20. FIG. 3A illustrates an example of a detection signal when the liquid L is not present in the container 105 and the container 105 is empty.

When the liquid L is not present in the container 105 and the container 105 is empty, the ultrasonic wave output from one of the outputs 10 is first reflected at an inner surface of the wall of the container 105 where the outputs and the detectors 20 are disposed, and is detected as a large amplitude reflection signal in a time region R1. Most of the ultrasonic wave is reflected at the inner surface of the wall and does not enter the interior of the container 105. After first reflecting at the inner surface of the wall of the container 105, the ultrasonic wave is repeatedly reflected back and forth between the inner and outer surfaces of the wall and is detected as a repeated reflection signal that continuously decays in other time regions following the time region R1.

Figure 3B:
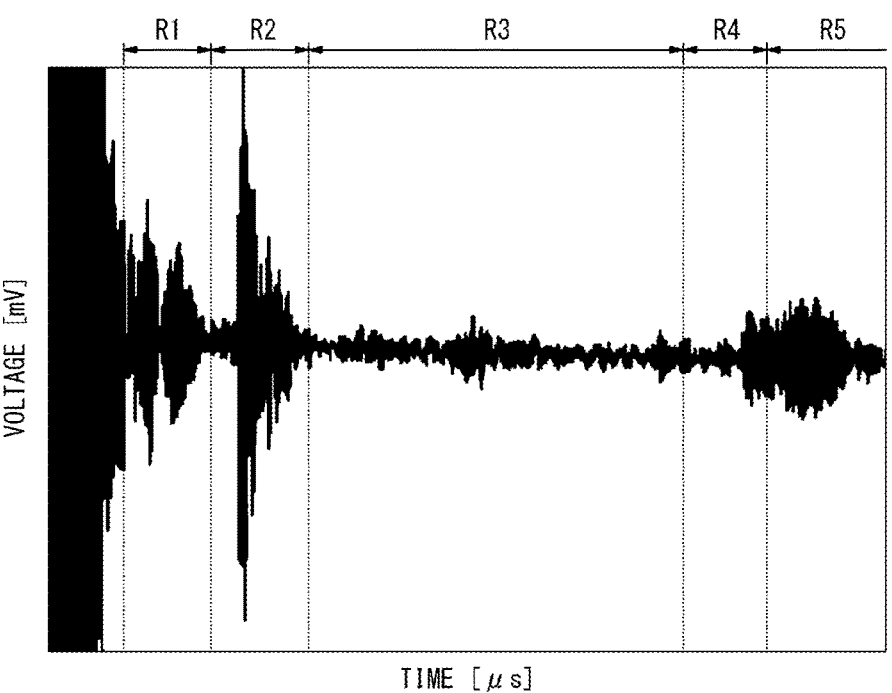
FIG. 3B is a graph illustrating example 2 of a detection signal from a detector.

FIG. 3B is a graph illustrating example 2 of a detection signal from one of the detectors 20. FIG. 3B illustrates an example of a detection signal when the object S, the bubbles B, and the like are not in the container 105 and only the liquid L is stored.

When only the liquid L is present in the container 105, some of an ultrasonic wave output from one of the outputs 10 is reflected at the inner surface of the wall of the container 105 where the outputs 10 and the detectors are disposed, but most of the ultrasonic wave enters the interior of the container 105 from the inner surface. The ultrasonic wave entering the interior of the container 105 is reflected at the stirrer blade 103, depending on the position of the stirrer blade 103. When the ultrasonic wave is reflected by the stirrer blade 103, the ultrasonic wave is detected as a large amplitude reflection signal in a time region R2.

Figure 3C:
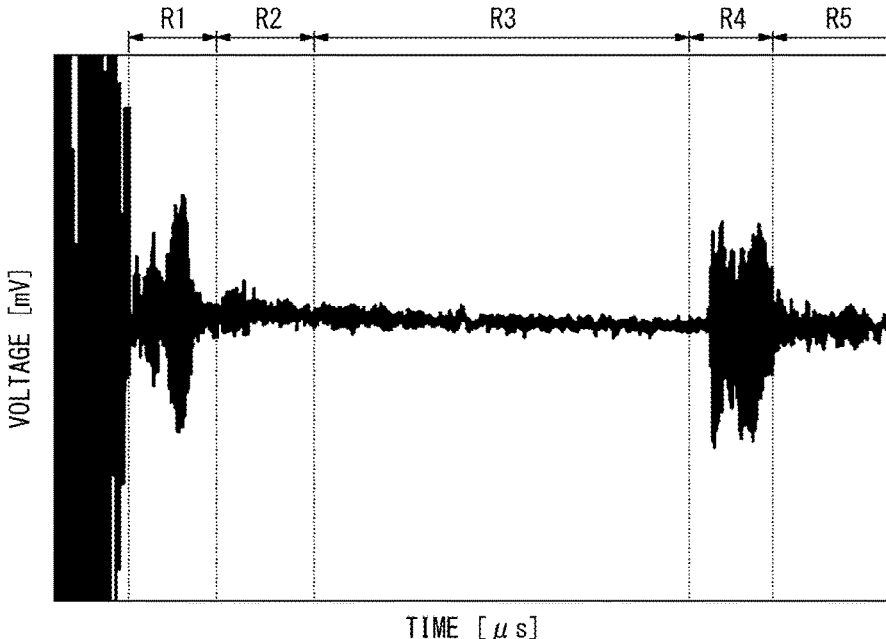
FIG. 3C is a graph illustrating example 3 of a detection signal from a detector.

FIG. 3C is a graph illustrating example 3 of a detection signal from one of the detectors 20. FIG. 3C illustrates an example of a detection signal when the object S, the bubbles B, and the like are not present in the container 105 and only the liquid L is stored.

When only the liquid L is present in the container 105, some of an ultrasonic wave output from one of the outputs 10 is reflected at the inner surface of the wall of the container 105 where the outputs 10 and the detectors are disposed, but most of the ultrasonic wave enters the interior of the container 105 from the inner surface. The ultrasonic wave entering the interior of the container 105 may be reflected at the stirring shaft 102 and not at the stirrer blade 103. When the ultrasonic wave is reflected at the stirring shaft 102, the ultrasonic wave is detected as a large amplitude reflection signal in a time region R4.

A reflection signal when the object S is completely dissolved in the liquid L has a similar trend as one of the detection signals in FIG. 3B and FIG. 3C when the object S, the bubbles B, and the like are not present in the container 105 and only the liquid L is stored.

Figure 3D:
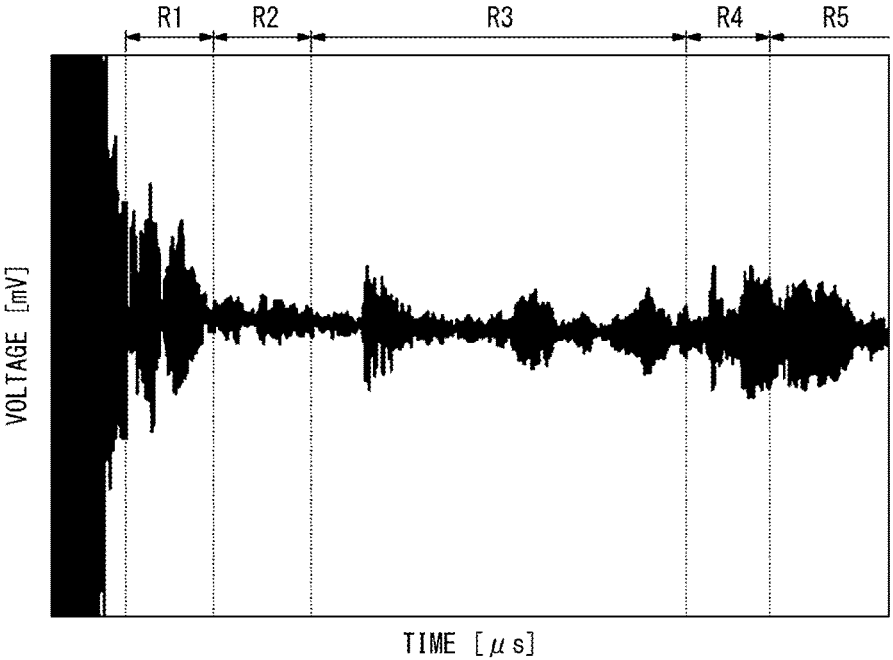
FIG. 3D is a graph illustrating example 4 of a detection signal from a detector.

FIG. 3D is a graph illustrating example 4 of a detection signal from one of the detectors 20. FIG. 3D illustrates an example of a detection signal when the object S, the bubbles B, and the like are present in the liquid L stored in the container 105.

When the object S, the bubbles B, and the like are present in addition to the liquid L in the container 105, an ultrasonic wave entering the interior of the container 105 from the inner surface of the wall of the container 105 where the outputs 10 and the detectors 20 are disposed is reflected at the object S, the bubbles B, and the like. When the object S precipitates at any location in the container 105, a reflection signal other than at the inner surface of the wall, for example in a range where precipitate is present, tends to be smaller in amplitude. When an ultrasonic wave is reflected at the object S, the bubbles B, and the like present in the liquid L between the inner surface of the wall described above and the stirring shaft 102, the ultrasonic wave is detected as reflection signals of small amplitude in a time region R3.

In addition, when the ultrasonic wave is reflected at the stirring shaft 102, the ultrasonic wave is detected as a reflection signal of relatively large amplitude in the time region R4. Otherwise, when the ultrasonic wave is reflected at the object S, the bubbles B, and the like present in the liquid L between the stirring shaft 102 and the inner surface of the wall opposite the wall described above, the ultrasonic wave is detected in a time region R5 as reflection signals similar to the reflection signals in the time region R3.

In FIG. 3A through FIG. 3D, only a portion of the time region R5 is illustrated. A reflection position at the inner surface of the wall opposite the wall described above is further to the right than the right edge of each graph.

Figure 4A:
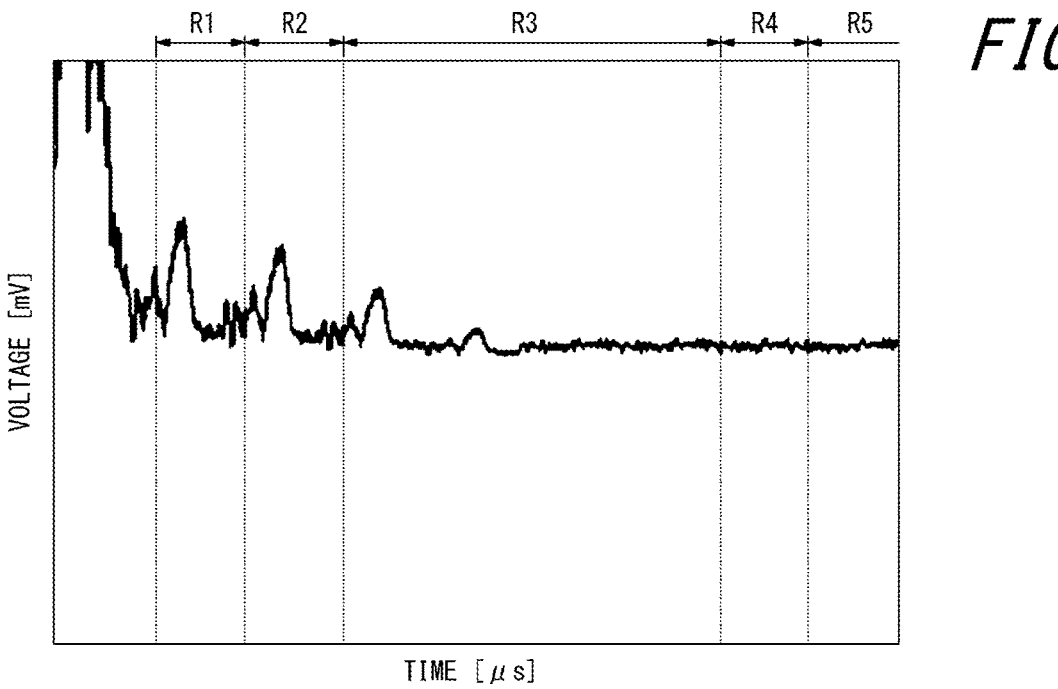
FIG. 4A is a graph illustrating example 5 of a detection signal from a detector.

FIG. 4A is a graph illustrating example 5 of a detection signal from one of the detectors 20. FIG. 4A illustrates envelope processing performed on the detection signal illustrated in FIG. 3A as an example method of processing the detection signal.

Figure 4B:
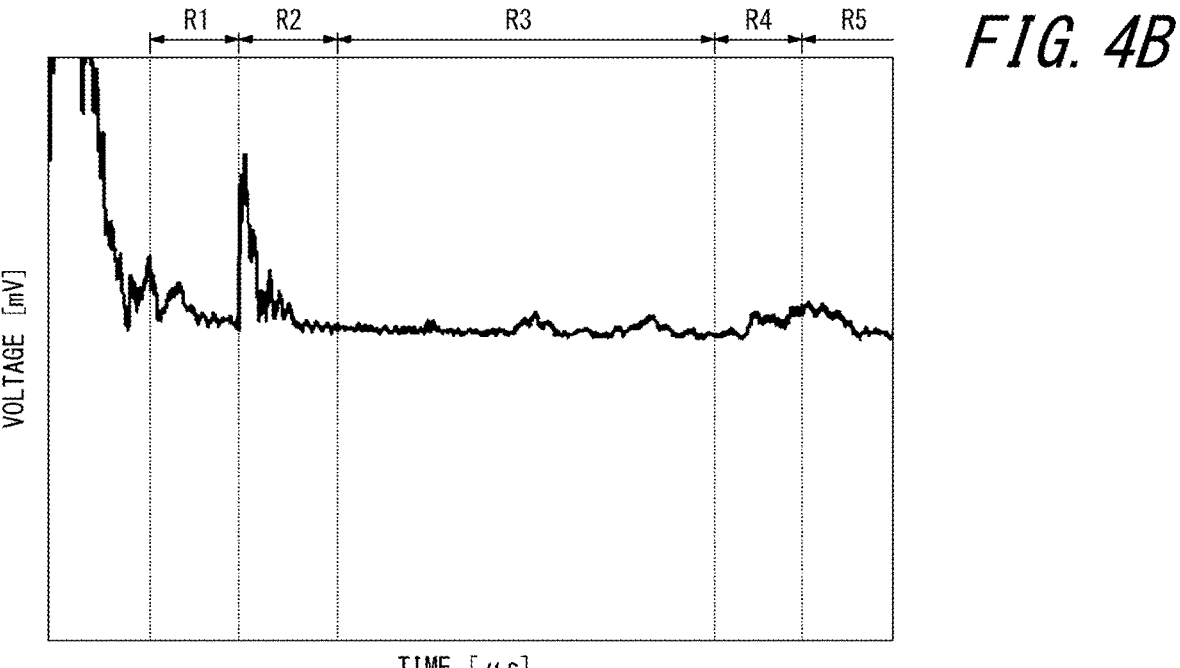
FIG. 4B is a graph illustrating example 6 of a detection signal from a detector.

FIG. 4B is a graph illustrating example 6 of a detection signal from one of the detectors 20. FIG. 4B illustrates envelope processing performed on the detection signal illustrated in FIG. 3B as an example method of processing the detection signal.

Figure 4C:
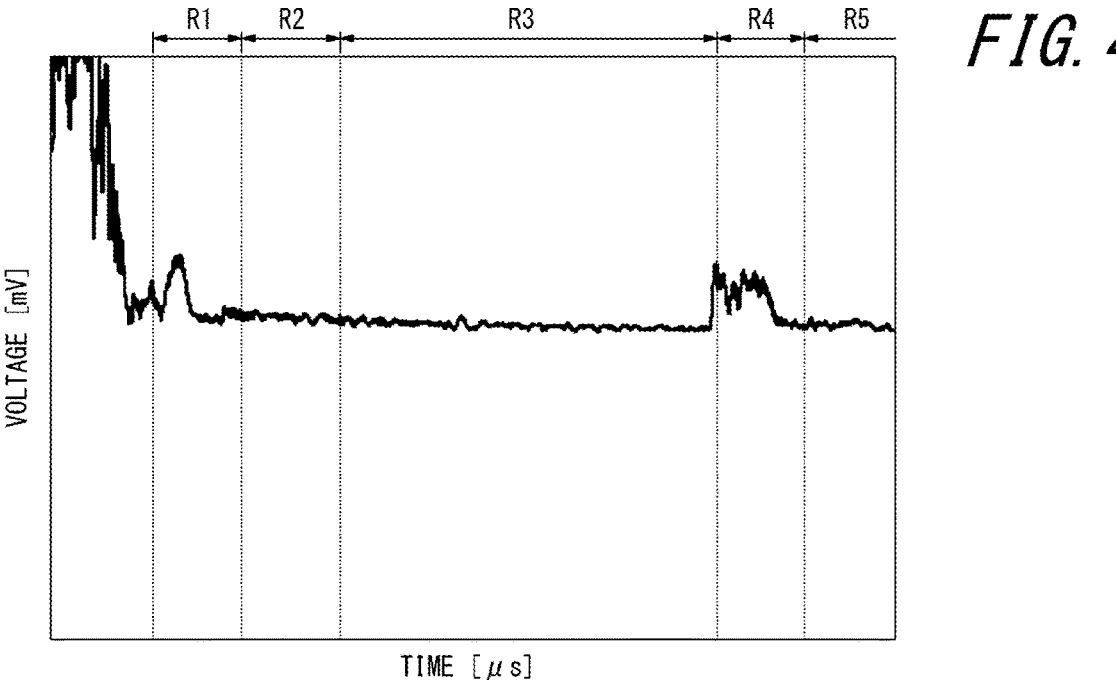
FIG. 4C is a graph illustrating example 7 of a detection signal from a detector.

FIG. 4C is a graph illustrating example 7 of a detection signal from one of the detectors 20. FIG. 4C illustrates envelope processing performed on the detection signal illustrated in FIG. 3C as an example method of processing the detection signal.

Figure 4D:
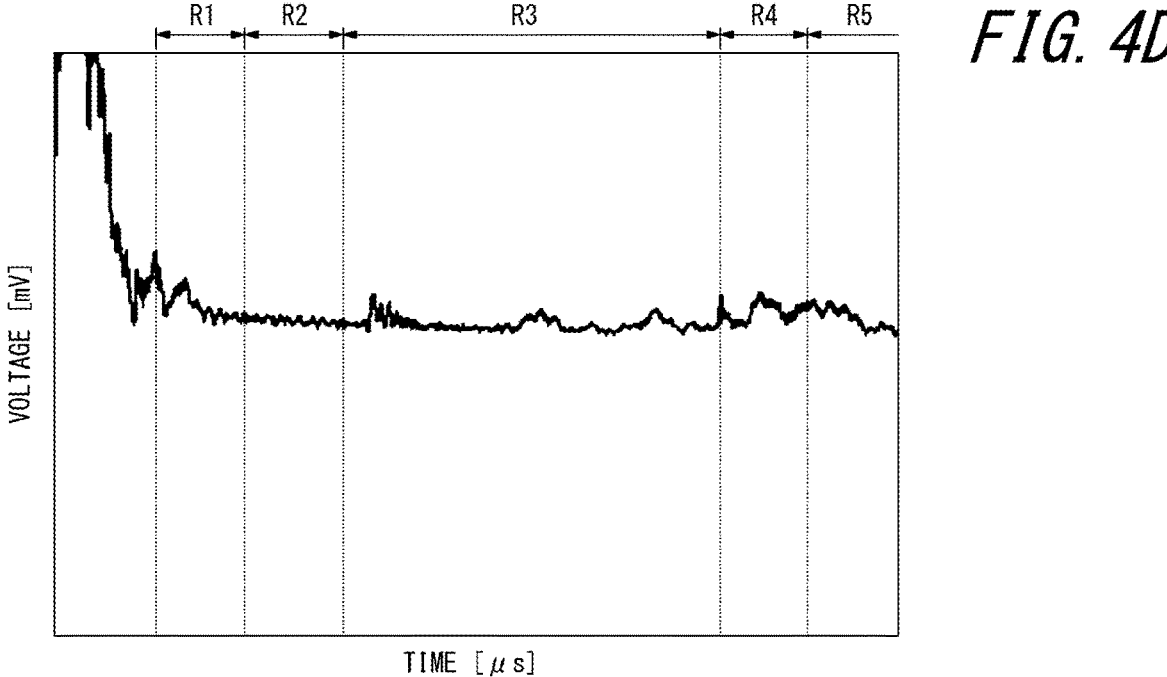
FIG. 4D is a graph illustrating example 8 of a detection signal from a detector.

FIG. 4D is a graph illustrating example 8 of a detection signal from one of the detectors 20. FIG. 4D illustrates envelope processing performed on the detection signal illustrated in FIG. 3D as an example method of processing the detection signal.

The controller 50 of the measurement apparatus 1 measures the state of the liquid L using waveform patterns and the like of the detection signals illustrated in FIG. 3A through FIG. 3D or FIG. 4A through FIG. 4D.

The measurement method performed by the measurement apparatus 1 is described in detail below.

(Product State of Liquid L)

The measurement apparatus 1 generates ultrasonic waves modulated at a specific output frequency in the outputs 10 and detects reflected waves reflected in the liquid L at the detectors 20. The measurement apparatus 1 obtains propagated waveform data in detection signals of ultrasonic waves mainly in the time regions R1 through R5, as illustrated in FIG. 3A through FIG. 4D. As described below, the measurement apparatus 1 measures the product state of the liquid L by comparing measurement data obtained from each of the detectors 20 with reference data obtained in an initial state before the start of stirring.

Figure 5:
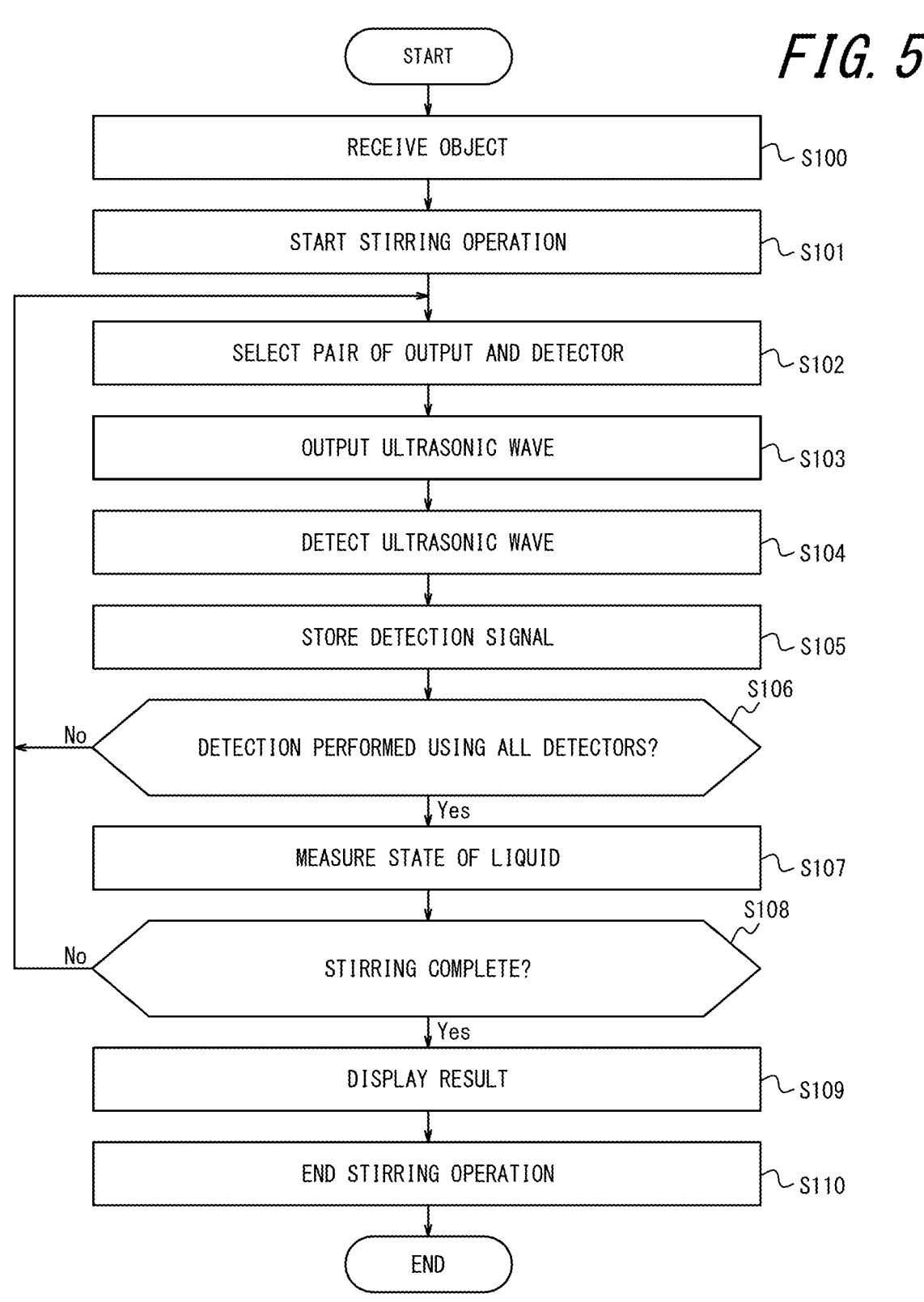
FIG. 5 is a flowchart for explanation of example 1 of operation of the measurement apparatus illustrated in FIG. 1.

FIG. 5 is a flowchart illustrating example 1 of operation of the measurement apparatus 1 illustrated in FIG. 1. Example 1 of a measurement method performed by the measurement apparatus 1 illustrated in FIG. 1 is described with reference to FIG. 5. The flowchart illustrated in FIG. 5 illustrates a basic processing flow of the measurement method when the product state of the liquid L in stirring, among states of the liquid L, is measured using the measurement apparatus 1.

In step S100, the stirrer 100 receives into the container 105 the materials required for stirring, such as the liquid L, the object S, and the like. A user opens the lid 104 of the stirrer 100 and puts the materials required for stirring, such as the liquid L, the object S, and the like, into the container 105.

In step S101, the stirrer 100 starts the stirring operation. More specifically, the stirrer 100 operates the motor 101 to drive the stirring shaft 102 and the stirrer blade 103 at a defined rotational speed. The stirrer 100 thereby stirs the materials received in step S100 inside the container 105.

In step S102, the control circuitry 51 in the controller 50 of the measurement apparatus 1 selects a pair of the outputs 10 and the detectors 20 to be operated from among the pairs of the outputs 10 and the detectors 20. In step S103, the control circuitry 51 in the controller 50 of the measurement apparatus 1 causes an ultrasonic wave to be output toward the interior of the container 105 using the output 10 selected in step S102. More specifically, the control circuitry 51 causes the output 10 to output an ultrasonic wave that propagates in the liquid L stored in the container 105.

In step S104, the control circuitry 51 in the controller 50 of the measurement apparatus 1 causes the ultrasonic wave to be detected using the detector 20 selected in step S102. More specifically, the control circuitry 51 causes the detector 20 to detect the ultrasonic wave propagated in the liquid L at a fixed position with respect to the container 105.

In step S105, the control circuitry 51 in the controller 50 of the measurement apparatus 1 causes a detection signal of the ultrasonic wave detected in step S104 to be stored in the memory 40 as information.

In step S106, the control circuitry 51 in the controller 50 of the measurement apparatus 1 determines whether detection has been performed using all of the detectors 20. When the controller 50 determines that detection has been performed using all of the detectors 20, the controller 50 performs the processing of step S107. For example, when the controller 50 determines that detection has been performed using all of the detectors 20 from the lower level to the upper level with respect to the three detectors 20 illustrated in FIG. 1, the controller 50 performs the processing of step S107. When the controller 50 determines that detection has not been performed using all of the detectors 20, the controller 50 performs the processing of step S102 again.

In step S107, the information processing terminal 52 included in the controller 50 of the measurement apparatus 1 measures the state of the liquid L used in stirring in the container 105 based on the ultrasonic waves detected in step S104 after determining in step S106 that detection was performed using all of the detectors 20. More specifically, the information processing terminal 52 measures the product state of the liquid L during stirring.

In step S108, the information processing terminal 52 included in the controller 50 of the measurement apparatus 1 determines whether the product state of the liquid L measured in step S107 has become a defined state and whether the stirring of the object S with respect to the liquid L is complete. In the present disclosure, the "defined state" includes, for example, a state in which the object S is completely mixed with respect to the liquid L. When the controller 50 determines that the stirring of the object S with respect to the liquid L is complete, the controller 50 performs the processing of step S109. When the controller 50 determines that the stirring of the object S with respect to the liquid L is not complete, the controller 50 returns to the processing of step S102.

In step S109, after determining that the stirring of the object S with respect to the liquid L is complete in step S108, the information processing terminal 52 included in the controller 50 of the measurement apparatus 1 causes display of a result of determination on the display 30. More specifically, the information processing terminal 52 causes display on the display 30 of visual information that the liquid L has the defined state and that the stirring of the object S with respect to the liquid L is complete.

In step S110, the stirrer 100 ends the stirring operation. More specifically, the stirrer 100 stops the operation of the motor 101 to stop the rotational operation of the stirring shaft 102 and the stirrer blade 103. Accordingly, the stirrer 100 ends stirring of the materials received in step S100 in the container 105.

The following describes processing of the controller 50 in steps S107 and S108 in more detail.

The measurement method of measuring the product state of the liquid L includes comparison with a reference. More specifically, the controller 50 measures the product state of the liquid L based on the reference data regarding the product state of the liquid L in a first reference state and the measurement data regarding the product state of the liquid L during stirring. In the present disclosure, the "first reference state" includes an initial state in which, for example, the bubbles B or the like are not present in the liquid L and the object S is not mixed at all with the liquid L after being introduced. In the product state of the liquid L in the first reference state, for example, the degree of mixing of the object S with the liquid L is zero.

The reference data includes a parameter of a reflection signal of an ultrasonic wave propagated in the liquid L in the first reference state. Such reference data includes data on ultrasonic waves detected for all of the detectors 20 and is stored in the memory 40 as a reference. In the present disclosure, the "parameter" includes at least one of, for example, the positive or negative beginning of a waveform, maximum amplitude, propagation time, speed of sound, and frequency including spectrum.

The controller 50 obtains reference data in advance as a reference, including the parameter, in the initial state of the system in which the object S for which successful mixing with the liquid L is to be checked, that is, the first reference state. For example, the controller 50 sets individual threshold values for each of the time regions R1 through R5 in FIG. 3A through FIG. 4D, and obtains the positive or negative beginning of the waveform of the reflection signal, maximum amplitude, propagation time, and speed of sound.

For example, the controller 50 performs fast Fourier transform (FFT) processing with respect to each of the time regions R1 through R5 in FIG. 3A through FIG. 4D to obtain frequencies including the spectrum of the reflection signal.

At any given timing during stirring, the controller 50 again obtains similar data to the reference data as the measurement data and stores the measurement data in the memory 40. The controller 50 performs the same processing as for the reference and obtains the parameter described above even during the stirring of the liquid L. As described above, in step S107 of FIG. 5, the controller 50 performs data analysis.

The controller 50 calculates a difference of the measurement data from the reference data and determines that the stirring of the object S with respect to the liquid L is complete when the difference is constant over a defined time. When the difference is zero, the controller 50 determines that there is no change in the product state of the liquid L from the first reference state. The controller 50 determines that a normal result is achieved, that is, the stirring is complete, when the amount of change in the difference is saturated. The difference of the measured data from the reference data includes, for example, a difference with respect to at least one of the five parameters mentioned above. It suffices that the controller 50 calculates the difference for at least one of the five parameters that change between the first reference state and any state during stirring.

(Position of Liquid Surface of Liquid L)

Figure 6:
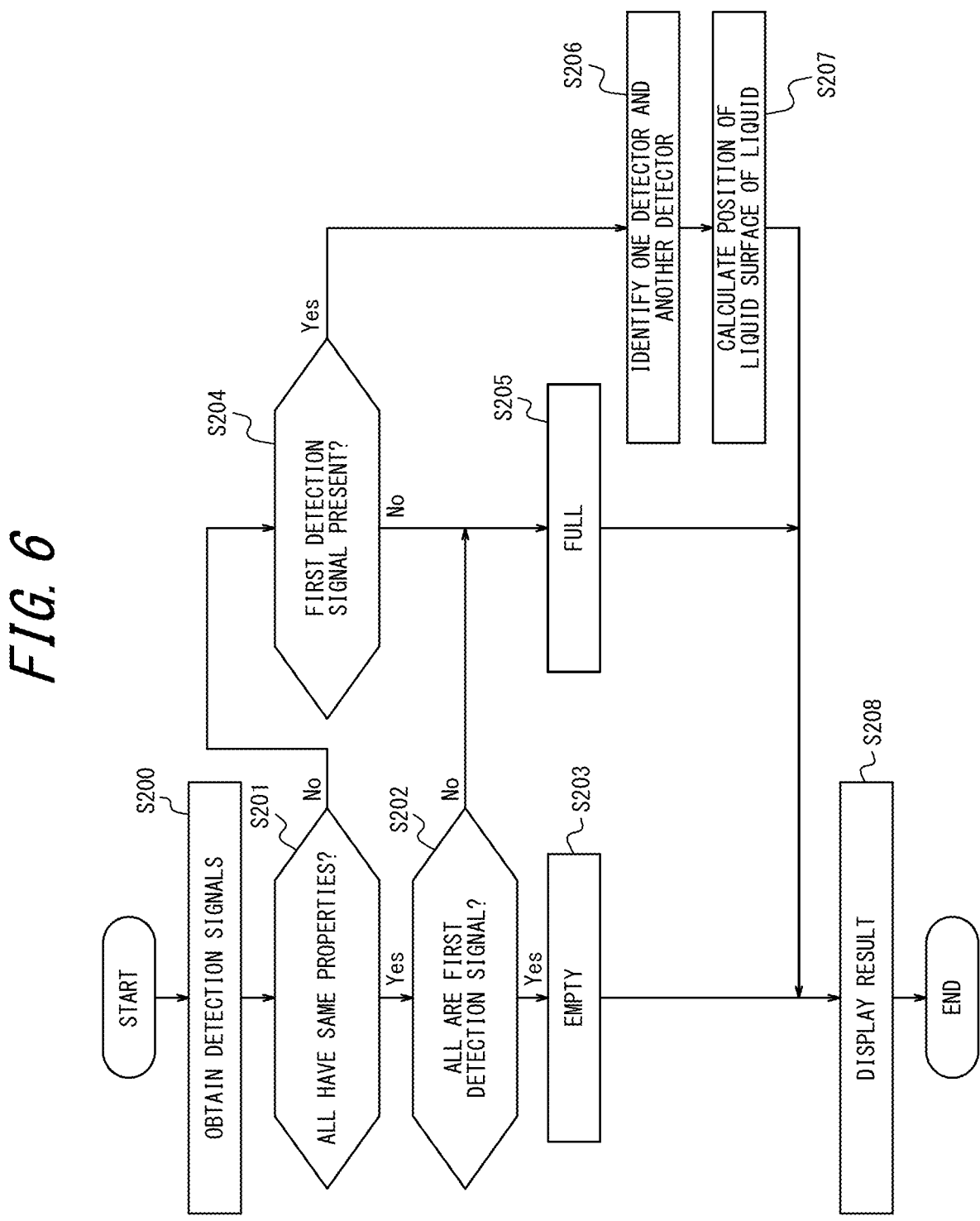
FIG. 6 is a flowchart for explanation of example 2 of operation of the measurement apparatus illustrated in FIG. 1.

FIG. 6 is a flowchart illustrating example 2 of operation of the measurement apparatus 1 illustrated in FIG. 1. Example 2 of the measurement method performed by the measurement apparatus 1 illustrated in FIG. 1 is described with reference to FIG. 6. The flowchart illustrated in FIG. 6 illustrates a basic processing flow of the measurement method when the position of the liquid surface of the liquid L in the container 105, among states of the liquid L, is measured using the measurement apparatus 1.

The controller 50 of the measurement apparatus 1 measures the position of the liquid surface of the liquid L based on detection signals of ultrasonic waves detected by the detectors 20.

In step S200, the controller 50 of the measurement apparatus 1 obtains detection signals related to ultrasonic waves output from the outputs 10 using the detectors 20 disposed along the outer surface of the container 105. Each detection signal corresponds to one illustrated as an example in any one of FIG. 3A through FIG. 3D, for example.

In step S201, the controller 50 of the measurement apparatus 1 determines whether the detection signals obtained in step S200 all have the same properties. When the controller 50 determines that all have the same properties, the controller 50 performs the processing of step S202. When the controller 50 determines that some properties are different, the controller 50 performs the processing of step S204.

In step S202, after the controller 50 of the measurement apparatus 1 determines that all the properties in step S201 are the same, the controller 50 determines whether all the properties correspond to a first detection signal. In the present disclosure, the "first detection signal" includes, for example, the detection signal illustrated in FIG. 3A or FIG. 4A when the liquid L is not present in the container 105 and the container 105 is empty. When the controller 50 determines that all correspond to the first detection signal, the controller 50 performs the processing of step S203. When the controller 50 determines that all do not correspond to the first detection signal, the controller 50 performs the processing of step S205.

In step S203, after the controller 50 of the measurement apparatus 1 determines all of the detection signals in step S202 correspond to the first detection signal, the controller 50 determines that the liquid L is not present in the container 105 and the container 105 is empty.

In step S204, after the controller 50 of the measurement apparatus 1 determines that some properties are different in step S201, the controller 50 determines whether the first detection signal is among the detection signals obtained in step S200. When the controller 50 determines that the first detection signal is present, the controller 50 performs the processing of step S206. When the controller 50 determines that the first detection signal is not present, the controller 50 performs the processing of step S205.

In step S205, after the controller 50 of the measurement apparatus 1 determines that the first detection signal is not present in step S204, the controller 50 determines that the container 105 is filled with the liquid L over an entire range where the detectors 20 are disposed and the container 105 is full.

In step S206, after the controller 50 of the measurement apparatus 1 determines that the first detection signal is present in step S204, the controller 50 identifies one of the detectors 20 that indicates the first detection signal and another adjacent one of the detectors 20 that indicates a second detection signal different from the first detection signal. In the present disclosure, the "second detection signal" includes, for example, the detection signal illustrated in any one of FIG. 3B through FIG. 3D or FIG. 4B through FIG. 4D when the liquid L is present in the container 105 and the container 105 is not empty.

In step S207, the controller 50 of the measurement apparatus 1 calculates a position between the one detector 20 and the other detector 20 identified in step S206 as the position of the liquid surface of the liquid L. In step S208, the controller 50 of the measurement apparatus 1 causes display on the display 30 of results regarding the position of the liquid surface of the liquid L, based on any one of steps S203, S205, and S207. More specifically, the controller 50 causes display of the position of the liquid surface of the liquid L in the container 105 and the like as visual information on the display 30.

Figure 7:
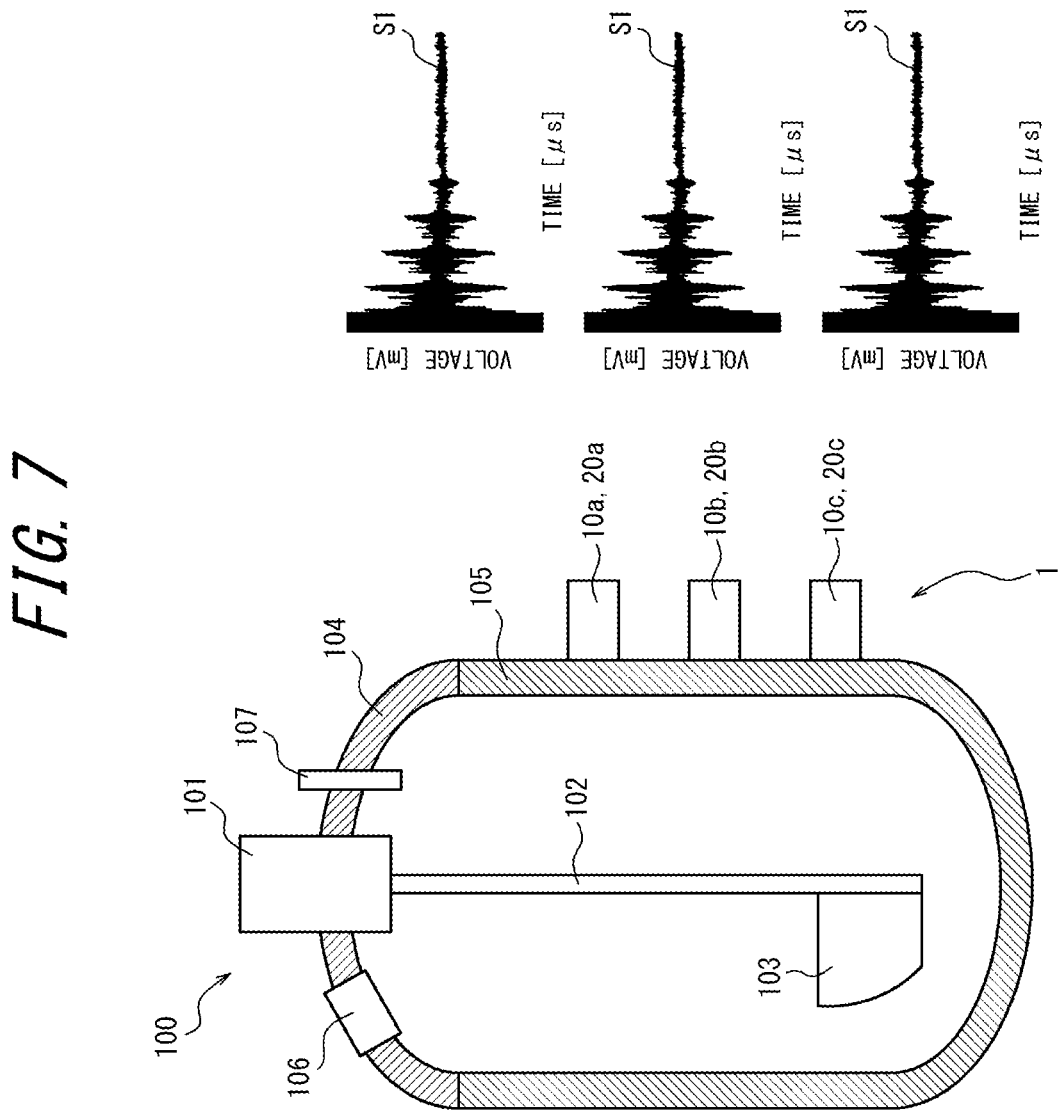
FIG. 7 is a schematic diagram illustrating an example of detection signals when a container is empty.

FIG. 7 is a schematic diagram illustrating an example of detection signals when the container 105 is empty.

When the container 105 is empty, the detection signals of the ultrasonic waves detected by the detector 20a, the detector 20b, and the detector 20c all correspond to the first detection signal S1. In other words, the detection signals indicate waveforms such that the reflection signals from the inner surface of the wall of the container 105 are at maximum in the time region R1 and the reflection signals from the stirring shaft 102 are zero in the time region R4, as illustrated in FIG. 3A or FIG. 4A.

On the other hand, when the container 105 is full, the detection signals of the ultrasonic waves detected by the detector 20a, the detector 20b, and the detector 20c all differ from the first detection signal S1. The detection signals may all have the same properties as each other, or at least some of the detection signals may have different properties.

Figure 8:
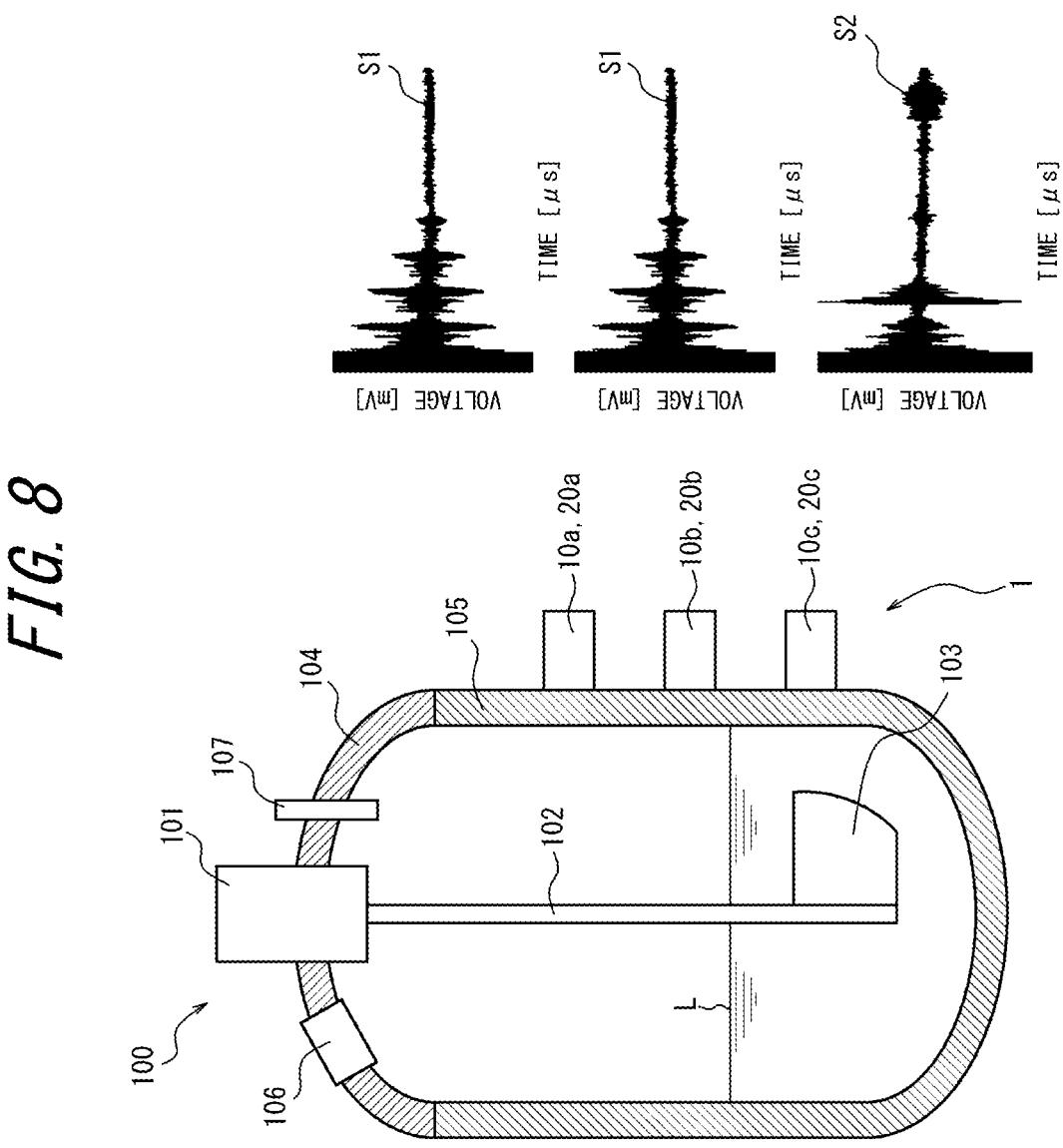
FIG. 8 is a schematic diagram illustrating an example 1 of detection signals when a container is not empty.

FIG. 8 is a schematic diagram illustrating example 1 of detection signals when the container 105 is not empty.

When the container 105 is not empty, the second detection signal S2 that differs from the first detection signal S1 at least in part is included among the detection signals of the ultrasonic waves detected by the detector 20a, the detector 20b, and the detector 20c. For example, in example 1 illustrated in FIG. 8, the second detection signal S2 corresponding to FIG. 3B is obtained at the detector 20c disposed at the lower level where the liquid L is filled and the stirrer blade 103 faces the detector 20c side. On the other hand, the first detection signal S1 is obtained at the detector 20b and the detector 20a disposed at middle and upper levels, respectively, which are not filled with the liquid L.

Figure 9:
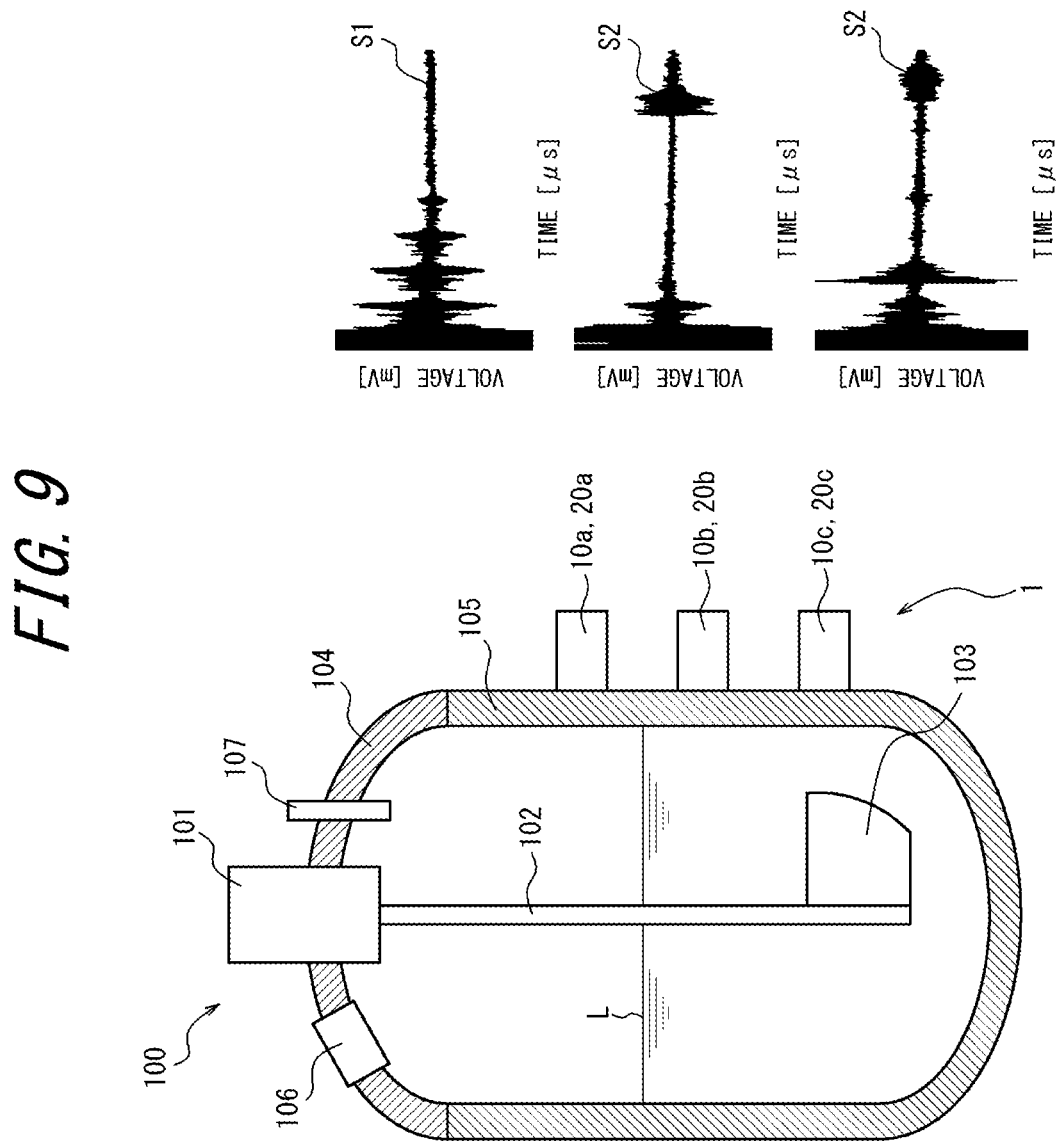
FIG. 9 is a schematic diagram illustrating an example 2 of detection signals when a container is not empty.

FIG. 9 is a schematic diagram illustrating example 2 of detection signals when the container 105 is not empty.

For example, in example 2 illustrated in FIG. 9, the second detection signal S2 is obtained at the detector 20c and the detector 20b, which are disposed in the lower and middle levels, respectively, which are filled with the liquid L. More specifically, the second detection signal S2 corresponding to FIG. 3B is obtained at the detector 20c at the lower level, where the stirrer blade 103 faces the detector 20c side. The second detection signal S2 corresponding to FIG. 3C is obtained at the detector 20b at the middle level, where the stirring shaft 102 extends. In contrast, the first detection signal S1 is obtained at the detector 20a disposed at the upper level, which is not filled with the liquid L.

Figure 10:
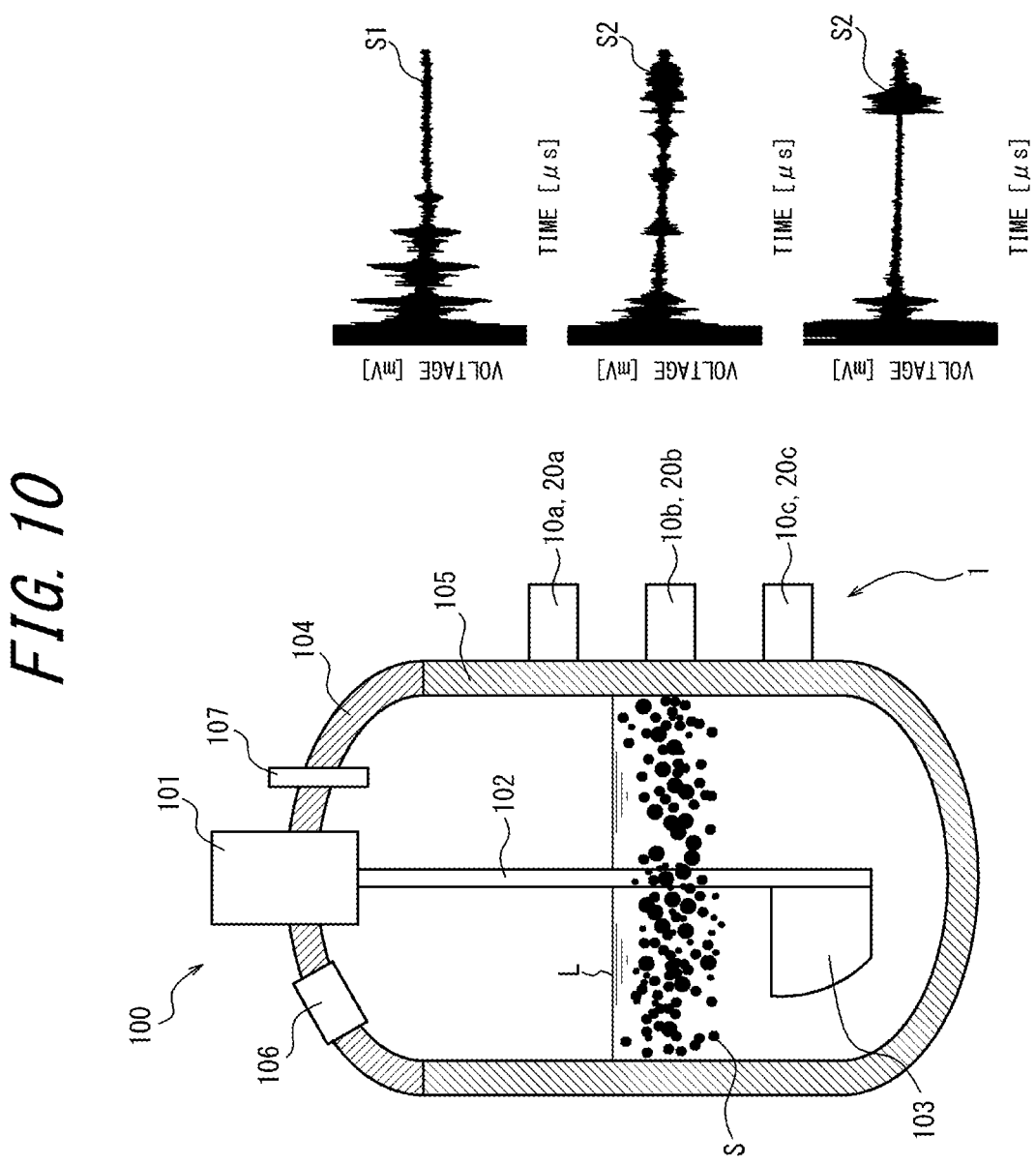
FIG. 10 is a schematic diagram illustrating an example 3 of detection signals when a container is not empty.

FIG. 10 is a schematic diagram illustrating example 3 of detection signals when the container 105 is not empty.

For example, in example 3 illustrated in FIG. 10, the second detection signal S2 is obtained at the detector 20c and the detector 20b, which are disposed at the lower and middle levels, respectively, which are filled with the liquid L. More specifically, the second detection signal S2 corresponding to FIG. 3C is obtained at the detector 20c at the lower level where the object S is not present and the stirrer blade 103 faces an opposite side to the detector 20c with the stirring shaft 102 facing the detector 20c. The second detection signal S2 corresponding to FIG. 3D is obtained at the detector 20b at the middle level, where the object S is present and the stirring shaft 102 extends. In contrast, the first detection signal S1 is obtained at the detector 20a disposed at the upper level, which is not filled with the liquid L.

Figure 11:
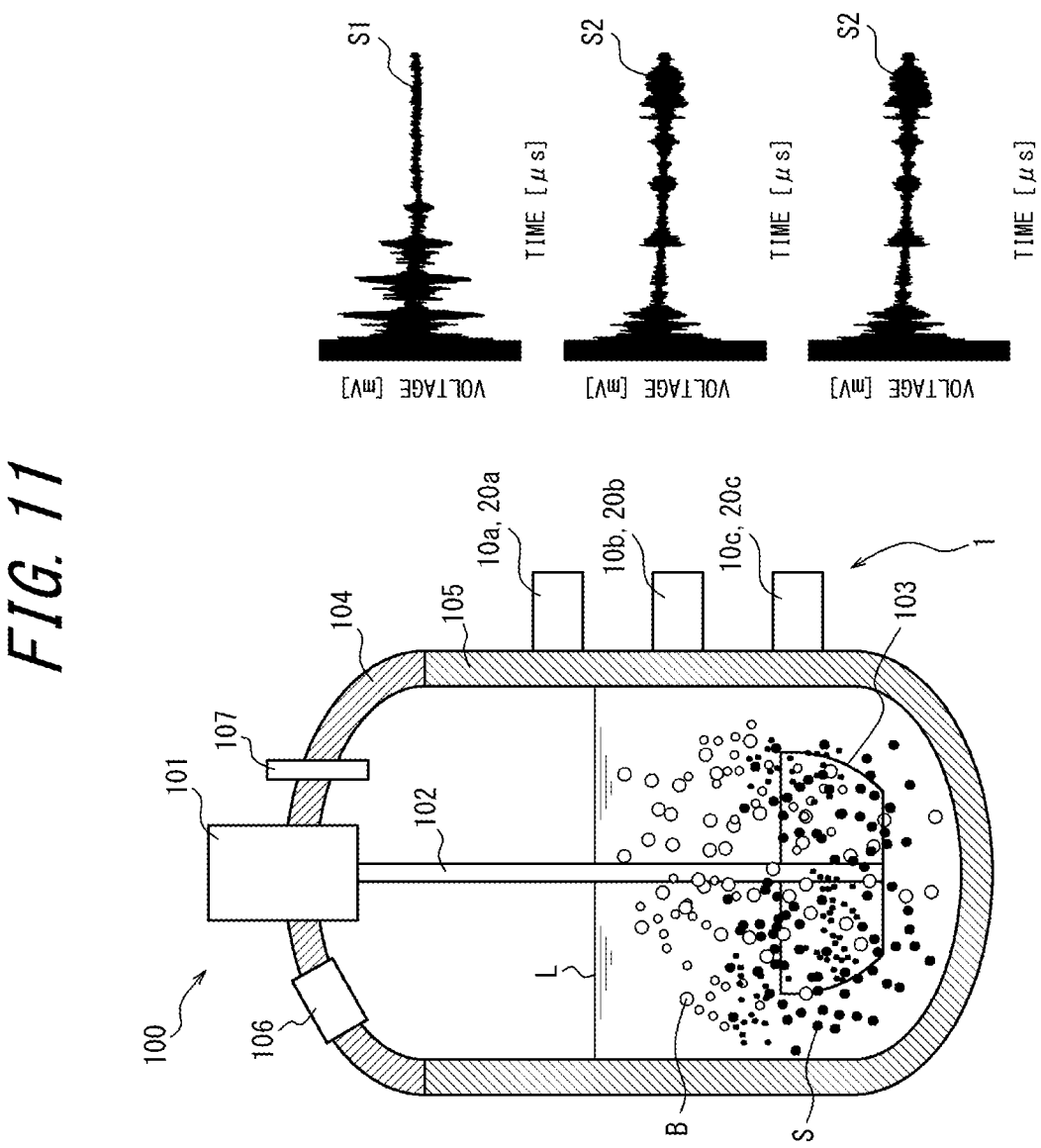
FIG. 11 is a schematic diagram illustrating an example 4 of detection signals when a container is not empty.

FIG. 11 is a schematic diagram illustrating example 4 of detection signals when the container 105 is not empty.

For example, in example 4 illustrated in FIG. 11, the second detection signal S2 is obtained at the detector 20c and the detector 20b, which are disposed in the lower and middle levels, respectively, which are filled with the liquid L. More specifically, the second detection signal S2 corresponding to FIG. 3D is obtained at the detector 20c at the lower level, where the object S, the bubbles B, and the like are present. Similarly, the second detection signal S2 corresponding to FIG. 3D is obtained at the detector 20b at the middle level, where the object S, the bubbles B, and the like are present. In contrast, the first detection signal S1 is obtained at the detector 20a disposed at the upper level, which is not filled with the liquid L.

As illustrated in FIG. 8 through FIG. 11, the controller 50 is able to identify the presence of the liquid L at locations where the second detection signal S2 is obtained and the absence of the liquid L at locations where the first detection signal S1 is obtained as a result of detection of ultrasonic waves by the detectors 20. In other words, the controller 50 is able to calculate the position between one of the detectors 20 indicating the first detection signal S1 and another adjacent one of the detectors 20 indicating the second detection signal S2 that is different from the first detection signal S1 as the position of the liquid surface of the liquid L.

For example, in example 1 illustrated in FIG. 8, the controller 50 calculates the position between the detector 20b and the detector 20c as the position of the liquid surface of the liquid L. For example, in examples 2 through 4 illustrated in FIG. 9 through FIG. 11, respectively, the controller 50 calculates the position between the detector 20a and the detector 20b as the position of the liquid surface of the liquid L.

A defined spacing is provided between the detectors 20 that are fixed. The controller 50 reads information on the defined spacing stored in the memory 40 and calculates the position of the liquid surface of the liquid L as a defined vertical range based on the information.

(Presence or Absence of Bubbles B or Particles)

The controller 50 of the measurement apparatus 1 measures the presence or absence of the bubbles B or particles based on at least one of the positive or negative beginning of the waveform and the speed of sound of the ultrasonic wave detected by the detectors 20. For example, the controller 50 obtains the positive or negative beginning of reference waveforms of reflection signals of ultrasonic waves output from the detectors 20 with the inside of the container 105 filled with the liquid L in a second reference state and stores the positive or negative beginnings in the memory 40. In the present disclosure, the "second reference state" includes, for example, a state in which the bubbles B are not present in the liquid L.

As long as the bubbles B are not present in the liquid L, the positive or negative beginnings of the waveforms of the reflection signals of the ultrasonic waves do not change. Therefore, the controller 50 is able to determine the presence or absence of the bubbles B in the liquid L based on the information regarding the positive or negative beginnings of the waveforms. For example, the beginning of a waveform of a reflection signal from any metal part, the stirrer blade 103, the stirring shaft 102, and the inner surface of the container 105, will be positive or negative according to a transmittance formula. The waveforms are unique and identical in shape, although there are amplitude differences according to the transmittance.

Figure 12:
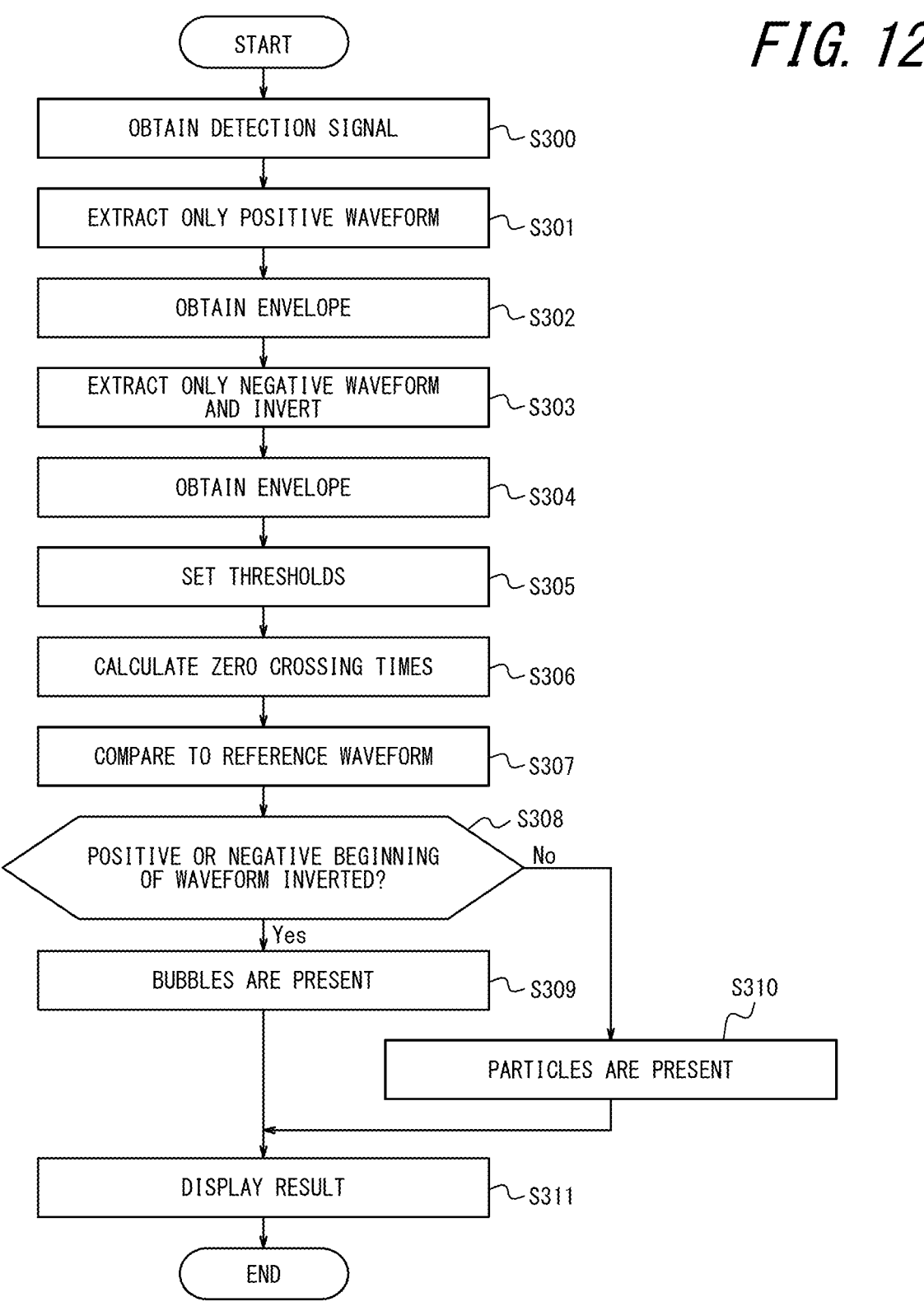
FIG. 12 is a flowchart for explanation of example 3 of operation of the measurement apparatus illustrated in FIG. 1.
Figure 13:
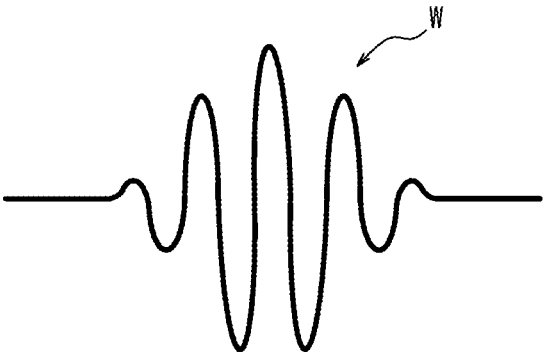
FIG. 13 is a schematic diagram for explanation of example 3 of operation of the measurement apparatus illustrated in FIG. 1.
Figure 13:
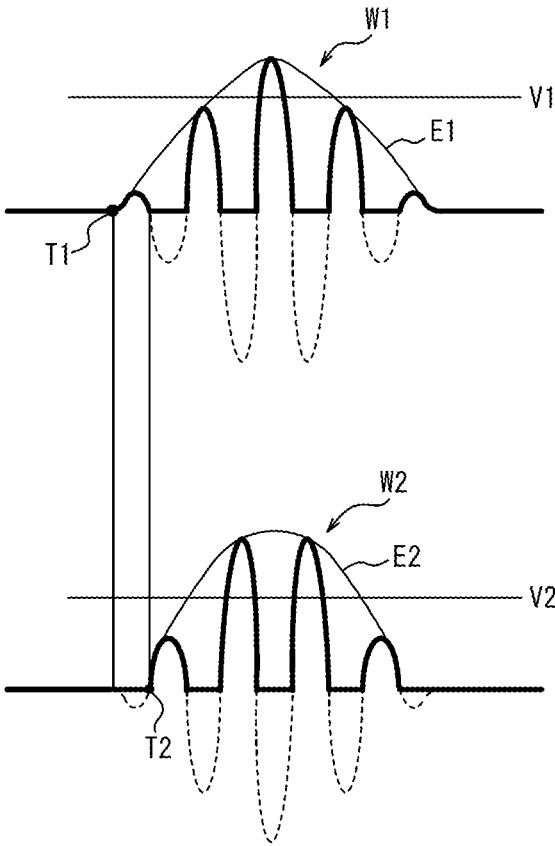

FIG. 12 is a flowchart illustrating example 3 of operation of the measurement apparatus 1 illustrated in FIG. 1. FIG. 13 is a schematic diagram illustrating example 3 of the operation of the measurement apparatus 1 in FIG. 1. Example 3 of the measurement method performed by the measurement apparatus 1 illustrated in FIG. 1 is described with reference to FIG. 12 and FIG. 13. The flowchart illustrated in FIG. 12 illustrates a basic processing flow of the measurement method when the presence or absence of the bubbles B or particles, among states of the liquid L, is measured using the measurement apparatus 1.

In step S300, the controller 50 of the measurement apparatus 1 obtains a detection signal from each of the detectors 20.

In step S301, the controller 50 of the measurement apparatus 1 extracts only a positive waveform from a propagation waveform for a defined reflection signal included in a detection signal obtained in step S300. For example, such a propagation waveform includes any waveform in the time region R3. For example, the controller 50 extracts only a positive waveform W1 from a propagation waveform W, as illustrated in FIG. 13.

In step S302, the controller 50 of the measurement apparatus 1 performs envelope processing on the positive waveform extracted in step S301. For example, the controller 50 obtains an envelope E1 of the positive waveform W1, as illustrated in FIG. 13.

In step S303, the controller 50 of the measurement apparatus 1 extracts only the negative waveform from the propagation waveform of the defined reflection signal included in the detection signal obtained in step S300, and inverts the negative waveform. For example, the controller 50 extracts only a negative waveform W2 from the propagation waveform W and inverts positive and negative as illustrated in FIG. 13.

In step S304, the controller 50 of the measurement apparatus 1 performs envelope processing on the negative waveform extracted in step S303. For example, the controller 50 obtains an envelope E2 of the negative waveform W2, as illustrated in FIG. 13.

In step S305, the controller 50 of the measurement apparatus 1 sets threshold values for the envelopes obtained in steps S302 and S304. For example, the controller 50 sets a threshold value V1 for the envelope E1 obtained in step S302, as illustrated in FIG. 13. For example, the controller 50 sets a threshold value V2 for the envelope E2 obtained in step S304.

In step S306, the controller 50 of the measurement apparatus 1 calculates zero-crossing times earlier than times corresponding to the threshold values set in step S305. For example, as illustrated in FIG. 13, the controller 50 calculates a zero-crossing time T1, which is earlier than the time corresponding to the threshold value V1 set in step S305. For example, the controller 50 calculates a zero-crossing time T2, which is earlier than the time corresponding to the threshold value V2 set in step S305. In the example illustrated in FIG. 13, the time T1 for the positive waveform W1 is earlier than the time T2 for the negative waveform W2. Therefore, the controller 50 calculates that the beginning of the propagation waveform W is positive.

In step S307, the controller 50 of the measurement apparatus 1 compares the positive or negative beginning of the waveform calculated in step S306 with that of a reference waveform when the liquid L is in the second reference state.

In step S308, the controller 50 of the measurement apparatus 1 determines whether the positive or negative beginning of the waveform calculated in step S306 is inverted relative to the positive or negative beginning of the reference waveform when the liquid L is in the second reference state. When the controller 50 determines that the positive or negative beginning of the waveform is inverted, the controller 50 performs the processing of step S309. When the controller 50 determines that the positive or negative beginning of the waveform is not inverted, the controller 50 performs the processing of step S310.

In step S309, the controller 50 of the measurement apparatus 1 determines that the bubbles B are present in the liquid L when the positive or negative beginning of the waveform is inverted in step S308. Thus, the controller 50 determines that the bubbles B are present in the liquid L when the positive or negative beginning of the waveform when the liquid L is being stirred is inverted relative to the positive or negative beginning of the reference waveform when the liquid L is in the second reference state.

In step S310, when the controller 50 of the measurement apparatus 1 determines that the positive or negative beginning of the waveform is not inverted in step S308, the controller 50 determines that particles, not the bubbles B, are present in the liquid L. Thus, the controller 50 determines that particles, not the bubbles B, are present in the liquid L when the positive or negative beginning of the waveform when the liquid L is being stirred is not inverted relative to the positive or negative beginning of the reference waveform when the liquid L is in the second reference state.

In step S311, the controller 50 of the measurement apparatus 1 causes display on the display 30 of a result regarding the presence or absence of the bubbles B or particles based on either step S309 or step S310. More specifically, the controller 50 causes the display 30 to display the presence or absence of the bubbles B, particles, and the like in the liquid L as visual information.

Figure 14:
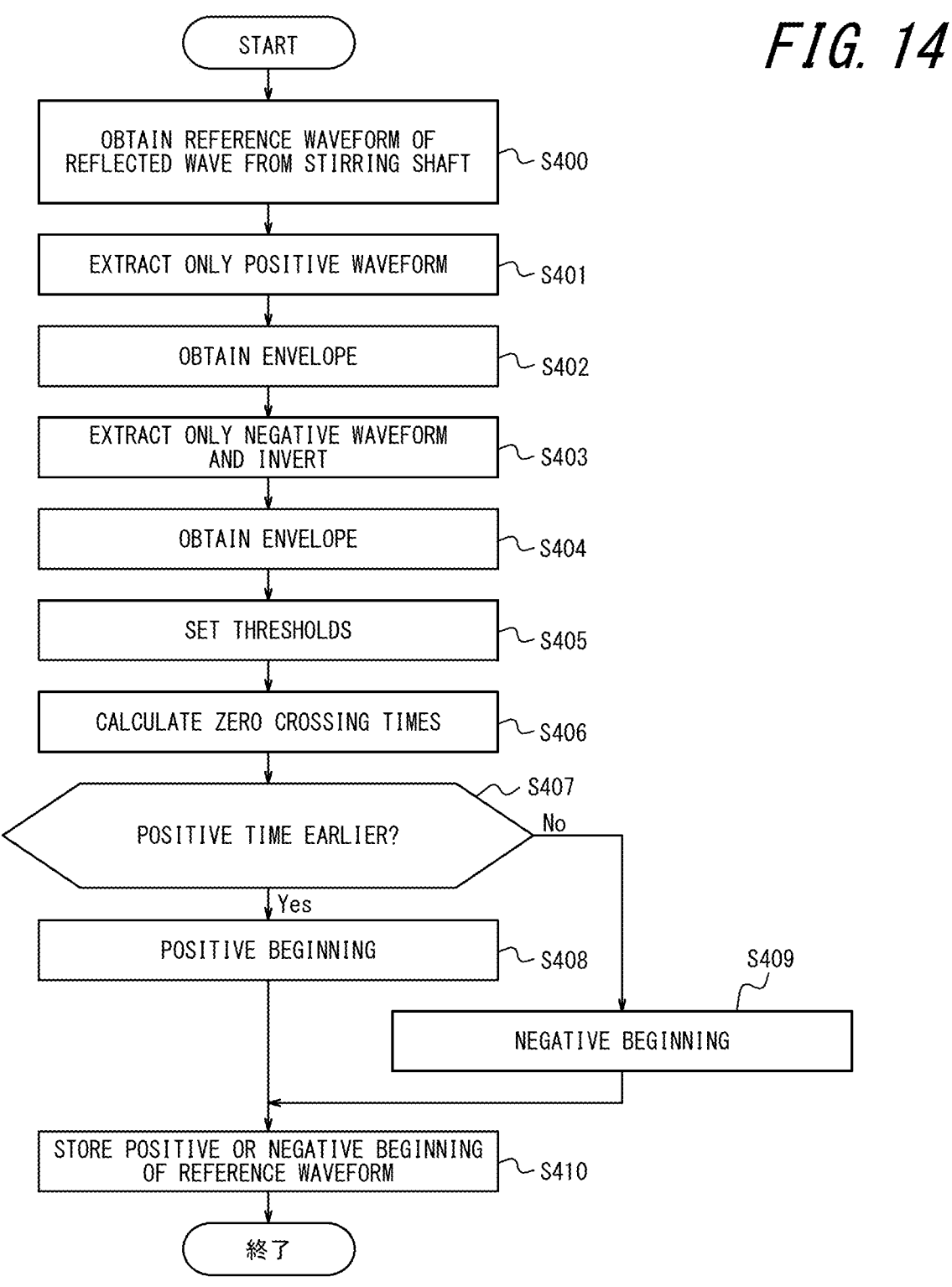
FIG. 14 is a flowchart for explanation of example 4 of operation of the measurement apparatus illustrated in FIG. 1.

FIG. 14 is a flowchart illustrating example 4 of operation of the measurement apparatus 1 illustrated in FIG. 1. Example 4 of the measurement method performed by the measurement apparatus 1 illustrated in FIG. 1 is described with reference to FIG. 14. The flowchart illustrated in FIG. 14 illustrates a basic processing flow of the measurement method when obtaining the reference waveform data used for the comparison processing in step S307 of FIG. 12.

In step S400, using each of the detectors 20, the controller 50 of the measurement apparatus 1 obtains a reference waveform of a reflected wave of an ultrasonic wave reflected from the stirring shaft 102.

In step S401, the controller 50 of the measurement apparatus 1 extracts only a positive waveform from the reference waveform obtained in step S400.

In step S402, the controller 50 of the measurement apparatus 1 performs envelope processing on the positive waveform extracted in step S401. The controller 50 obtains the envelope of the positive waveform.

In step S403, the controller 50 of the measurement apparatus 1 extracts only the negative waveform from the reference waveform obtained in step S400 and inverts the negative waveform.

In step S404, the controller 50 of the measurement apparatus 1 performs envelope processing on the negative waveform extracted in step S403. The controller 50 obtains the envelope of the negative waveform.

In step S405, the controller 50 of the measurement apparatus 1 sets threshold values for the envelopes obtained in steps S402 and S404.

In step S406, the controller 50 of the measurement apparatus 1 calculates zero-crossing times earlier than times corresponding to the threshold values set in step S405.

In step S407, the controller 50 of the measurement apparatus 1 determines whether the zero-crossing time for the positive waveform calculated in step S406 is earlier than the zero-crossing time for the negative waveform. When the controller 50 determines that the time for the positive waveform is earlier, the controller 50 performs the processing of step S408. When the controller 50 determines that the time for the negative waveform is earlier, the controller 50 performs the processing of step S409.

In step S408, the controller 50 of the measurement apparatus 1 calculates that the beginning of the reference waveform is positive when the time for the positive waveform is determined to be earlier in step S407.

In step S409, the controller 50 of the measurement apparatus 1 calculates that the beginning of the reference waveform is negative when the time for the negative waveform is determined to be earlier in step S407.

In step S410, the controller 50 of the measurement apparatus 1 stores the positive or negative beginning of the reference waveform calculated in step S408 or step S409 in the memory 40.

The controller 50 of the measurement apparatus 1 may measure the presence or absence of the bubbles B or particles based on the speed of sound of the ultrasonic waves detected by the detectors 20 instead of or in addition to the positive or negative beginnings of the waveforms of the ultrasonic waves as described above. When the bubbles B or particles are present in the liquid L, the speed of sound of the ultrasonic waves propagating in the liquid L changes. Therefore, the propagation times of the ultrasonic waves change, and the time positions of the propagation waveforms change in the detection signals. The controller 50 may also measure the presence or absence of the bubbles B or particles based on such changes in time positions.

(Density of Bubbles B or Particles)

The controller 50 of the measurement apparatus 1 measures the density of the bubbles B or particles based on the speed of sound of the ultrasonic waves detected by the detectors 20.

For example, let the density of the liquid L be $\rho_w$, the density of the bubbles B be pa, the bulk modulus of the bubbles B be $K_a$, and the volume fraction of the bubbles B be $\alpha$. The volume fraction $\alpha$ is expressed as $\rho_a/(\rho_w+\rho_a)$. In this case, the speed of sound c of the liquid L mixed with the bubbles B is expressed by the following formula.

$$c = \sqrt{\frac{K_a}{\alpha(1-\alpha)\rho_w}} \qquad \text{(Formula 1)}$$

As indicated in Formula 1, as the amount of the bubbles B, that is, the density $\rho_a$, increases, the speed of sound c slows down. The controller 50 is able to back-calculate the volume fraction $\alpha$ from Formula 1 by calculating the speed of sound c in the liquid L mixed with the bubbles B based on the reflection signal detected during stirring.

Figure 15:
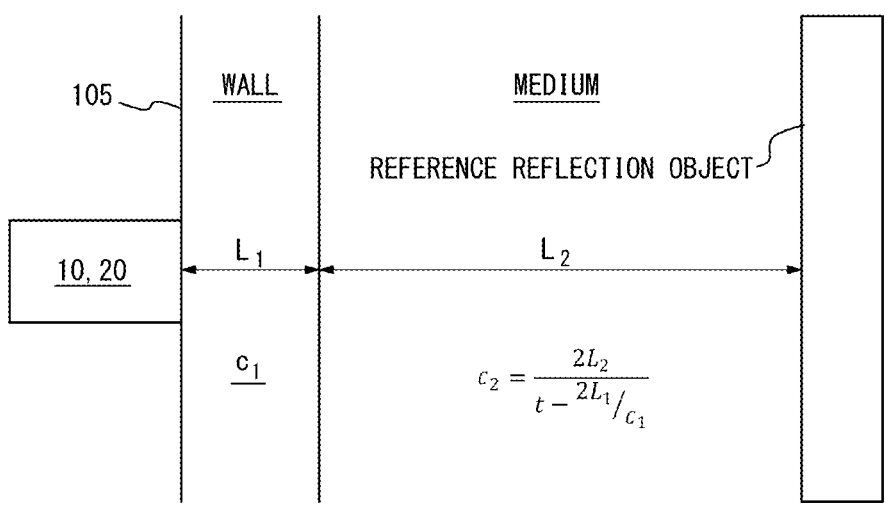
FIG. 15 is a schematic diagram for explanation of a calculation method for calculating the speed of sound in a liquid.
Figure 15:
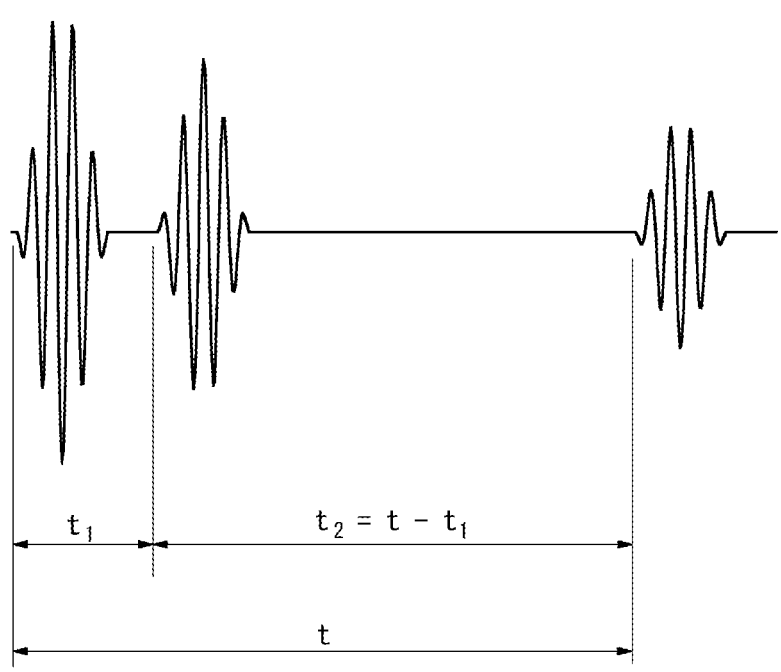

FIG. 15 is a schematic diagram for explanation of the calculation method for calculating the speed of sound in the liquid L.

The controller 50 is able to calculate the ratio of the amount of the bubbles B, that is, the volume fraction α, by obtaining a reference speed of sound in advance from a reference detection signal and comparing time positions of a reflection signal detected during stirring with the reference detection signal. A reference is needed to measure the change in speed of sound. More specifically, as illustrated in FIG. 15, the controller 50 measures a propagation time t of an ultrasonic wave output from one of the outputs 10 to a reference reflection object in the stirrer 100, based on the reflection signal detected by one of the detectors 20. In the present disclosure, the "reference reflection object" includes, for example, the stirring shaft 102, the stirrer blade 103, and the inner surface of the opposite wall.

When the bubbles B are present in the liquid L, a reflection signal between the inner surface of the wall of the container 105 and the reference reflection object may be detected by the detectors 20. In order to avoid that the speed of sound is calculated by detecting such a reflection signal, the reflection signal is obtained several times using a non-moving reference reflection object, the waveforms are averaged, and then a threshold is used in calculation of the propagation time t.

The controller 50 calculates the speed of sound $c_2$ at the time of reference in the liquid L as the medium based on: the speed of sound $c_1$ within the wall of the container 105 and thickness $L_1$ of the wall, which are stored in advance in the memory 40; distance $L_2$ from the inner surface of the wall of the container 105 to the reference reflection object; and the measured propagation time t. Similarly, the controller 50 measures the propagation time t when the medium changes during stirring and calculates the speed of sound $c_2$ during stirring of the liquid L. The controller 50 compares the speed of sound $c_2$ between the time of reference and during stirring, and back-calculates the volume fraction α from Formula 1.

The above calculation processing for the volume fraction α applies equally well when particles as solids are dispersed in the liquid L rather than the bubbles B.

(Density of Liquid L)

The density of the liquid L changes when the object S is stirred with respect to the liquid L. When the density of the liquid L changes, the speed of sound of ultrasonic waves propagating in the liquid L changes. For example, the speed of sound c of an ultrasonic wave propagating through a solid, assuming the elastic modulus of the solid is M and the density is p, is represented by the following formula.

$$c = \sqrt{\frac{M}{\rho}} \qquad \text{(Formula 2)}$$

Similarly, the speed of sound c of an ultrasonic wave propagating in the liquid L, assuming the bulk modulus of the liquid L is K and the density is ρ, is represented by the following formula.

$$c = \sqrt{\frac{K}{\rho}} \qquad \text{(Formula 3)}$$

From the above, as the density p increases, the speed of sound slows down, and as the density p decreases, the speed of sound speeds up. The controller 50 is able to measure the density p of the liquid L based on the change in the reflection signal reflected at the reference reflection object described with reference to FIG. 15, for example. More specifically, the controller 50 measures the propagation time t of the reflection signal reflected at the reference reflection object and calculates the speed of sound $c_2$ when the liquid L is the medium. The controller 50 back-calculates the density p from Formula 3 based on the calculated speed of sound $c_2$.

(Viscosity of Liquid L)

In addition to the state of the liquid L as described above, the controller 50 is also able to measure the viscosity of the liquid L. The greater the viscosity of the liquid L, the greater the attenuation of the amplitude of the reflection signal illustrated in FIG. 15. On the other hand, the smaller the viscosity of the liquid L, the smaller the attenuation of the amplitude of the reflection signal. The controller 50 obtains reference data in advance that correlates the amplitude of the reflection signal to the viscosity of the liquid L. The controller 50 is also able to measure the viscosity of the liquid L by measuring amplitude based on the reflection signal of an ultrasonic wave propagated in the liquid L during stirring, and comparing with the reference data.

(Effects)

According to the measurement apparatus 1 of the embodiment described above, the state of the liquid L used in stirring is more easily measured even during stirring. The measurement apparatus 1 measures the state of the liquid L used in stirring in the container 105 by detecting ultrasonic waves using the detectors 20 fixed to the container 105.

Accordingly, the measurement apparatus 1 is able to quantitatively measure the state of the liquid L used in stirring by sensing other than sensing a specific physical quantity, without having to open the lid 104 of the container 105, during stirring in the container 105. The measurement apparatus 1 is able to measure the state of the liquid L in real time, even during stirring, without removing the liquid L in the stirrer 100. This improves the convenience of the measurement apparatus 1 when measuring the state of the liquid L used in stirring in the container 105 of the stirrer 100.

By measuring the product state of the liquid L based on the reference data and the measurement data during stirring, the measurement apparatus 1 is able to more easily measure the product state of the liquid L in stirring, even during stirring. The measurement apparatus 1 is able to easily check the product state of the liquid L in stirring by quantitatively determining the product state of the liquid L in stirring without using a unique formula to measure a specific physical quantity in the real time measurement described above. Therefore, a similar effect is achieved to that described above, of improvement in convenience of the measurement apparatus 1.

The measurement apparatus 1 is able to quantitatively determine that the object S has been successfully mixed with the liquid L by determining that the stirring is complete when the difference of the measured data from the reference data becomes constant over a defined time period. The measurement apparatus 1 is able to quantitatively determine that stirring is complete without opening the lid 104 of the container 105. The measurement apparatus 1 is able to determine, in real time, that the stirring is complete without removing the liquid L in the stirrer 100. Therefore, a similar effect is achieved to that described above, of improvement in convenience of the measurement apparatus 1.

The measurement apparatus 1 is able to more easily measure the position of the liquid surface of the liquid L, even during stirring, by measuring the position of the liquid surface of the liquid L based on the detection signals detected by the detectors 20. The measurement apparatus 1 is able to easily measure the position of the liquid surface of the liquid L without opening the lid 104 of the container 105 during stirring in the container 105. The measurement apparatus 1 is able to measure the position of the liquid surface of the liquid L in real time, even during stirring, without opening the lid 104. Therefore, a similar effect is achieved to that described above, of improvement in convenience of the measurement apparatus 1.

The measurement apparatus 1 calculates the position between one of the detectors 20 indicating the first detection signal S1 and another adjacent one of the detectors 20 indicating the second detection signal S2 that is different from the first detection signal S1 as the position of the liquid surface of the liquid L. Accordingly, the measurement apparatus 1 is able to more easily measure the position of the liquid surface of the liquid L, even during stirring, based on the detection signals obtained by the detectors 20. Therefore, a similar effect is achieved to that described above, of improvement in convenience of the measurement apparatus 1.

The measurement apparatus 1 is able to more easily measure the presence or absence of the bubbles B or particles, even during stirring, by measuring the presence or absence of the bubbles B or particles based on at least one of the positive or negative beginnings of the waveforms and the speed of sound of the ultrasonic waves detected by the detectors 20. The measurement apparatus 1 is able to easily measure the presence or absence of the bubbles B or particles without opening the lid 104 of the container 105 during stirring in the container 105. The measurement apparatus 1 is able to measure the presence or absence of the bubbles B or particles in real time, even during stirring, without opening the lid 104. Therefore, a similar effect is achieved to that described above, of improvement in convenience of the measurement apparatus 1.

The measurement apparatus 1 determines that the bubbles B are present when the positive or negative beginning of the waveform when the liquid L is being stirred is inverted relative to the positive or negative beginning of the reference waveform when the liquid L is in the second reference state. Accordingly, the measurement apparatus 1 is able to objectively measure the presence or absence of the bubbles B based on waveform shape changes. Therefore, a similar effect is achieved to that described above, of improvement in convenience of the measurement apparatus 1.

The measurement apparatus 1 is able to more easily measure the density of the bubbles B or particles, even during stirring, by measuring the density of the bubbles B or particles based on the speed of sound of ultrasonic waves detected by the detectors 20. The measurement apparatus 1 is able to easily measure the density of the bubbles B or particles without opening the lid 104 of the container 105 during stirring in the container 105. The measurement apparatus 1 is able to measure the density of the bubbles B or particles in real time, even during stirring, without opening the lid 104. Therefore, a similar effect is achieved to that described above, of improvement in convenience of the measurement apparatus 1.

The pairs of the outputs 10 and the detectors 20 are disposed along the outer surface of the container 105, such that the measurement apparatus 1 is able to easily measure from outside the stirrer 100 the state of the liquid L being stirred. The measurement apparatus 1 is able to easily measure the state of the liquid L from outside, without opening the lid 104 of the container 105 during stirring in the container 105. The measurement apparatus 1 is able to measure the state of the liquid L from outside in real time, even during stirring, without opening the lid 104. Therefore, a similar effect is achieved to that described above, of improvement in convenience of the measurement apparatus 1.

(Variations)

Although the present disclosure has been described based on the drawings and examples, it should be noted that a person skilled in the art may easily make variations and modifications based on the present disclosure. Therefore, it should be noted that such variations and modifications are included within the scope of the present disclosure. For example, functions and the like included in each structure and step may be rearranged, and multiple structures and steps may be combined into one or divided, as long as no logical inconsistency results.

For example, the present disclosure may be realized as a program describing the processing content to realize each function of the measurement apparatus 1 described above, or as a storage medium on which the program is stored. The scope of the present disclosure should be understood to include these examples.

For example, the shape, size, arrangement, orientation, and number of each of the components described above are not limited to those illustrated in the above description and drawings. The shape, size, arrangement, orientation, and number of each of the components may be configured arbitrarily, as long as the function thereof is achievable.

In the embodiment described above, the controller 50 is described as including the control circuitry 51 and the information processing terminal 52 as separate components, but the controller 50 is not limited to this. The controller 50 may be configured as a single control module that combines the functions of the control circuitry 51 with the functions of the information processing terminal 52.

In the embodiment described above, the first reference state is described as including an initial state in which, for example, the bubbles B or the like are not present in the liquid L and the object S is not mixed at all with the liquid L after being introduced, but the first reference state is not limited to this. The first reference state may include, instead of or in addition to such an initial state, an end state in which the bubbles B and the like are not present in the liquid L and the object S is completely mixed with the liquid L.

In such a case, the measurement apparatus 1 may perform a different determination process instead of or in addition to the determination process of determining that the stirring of the object S with respect to the liquid L is complete when the difference of the measurement data from the reference data becomes constant over a defined time. Such a determination process may include determining that the stirring of the object S with respect to the liquid L is complete when the measurement data falls within a defined error range relative to the reference data regarding the product state of the liquid L in the first reference state as the end state.

In the embodiment described above, the measurement apparatus 1 is described as using a plurality of the detectors 20 to measure the position of the liquid surface of the liquid L, but the measurement apparatus 1 is not limited to this. Instead of or in addition to such a measurement process, the measurement apparatus 1 may determine that the position of the liquid surface of the liquid L has exceeded a certain level by repeatedly performing detection of ultrasonic waves using only one of the detectors 20 and observing how the detection signals change from the first detection signal S1 to the second detection signal S2.

In the embodiment described above, in measuring the presence or absence of the bubbles B or particles, the measurement apparatus 1 is described as extracting an arbitrary propagation waveform W from the time region R3, for example, and performing envelope processing or the like, but the measurement apparatus 1 is not limited to this. The measurement apparatus 1 may perform different waveform processing instead of or in addition to such processing. Such waveform processing may include a method based on, for example, a zero-crossing method, correlation, a Hilbert transform, and the like.

In the embodiment described above, the pairs of the outputs 10 and the detectors 20 are described as being disposed along the outer surface of the container 105, but the outputs 10 and the detectors 20 are not limited to this. The outputs 10 and the detectors 20 do not have to be disposed in the same position as pairs and may be separate from each other. At least one of the outputs 10 may be disposed inside the container 105 instead of outside the container 105. At least one of the detectors 20 may be disposed inside the container 105 instead of outside the container 105.

Figure 16:
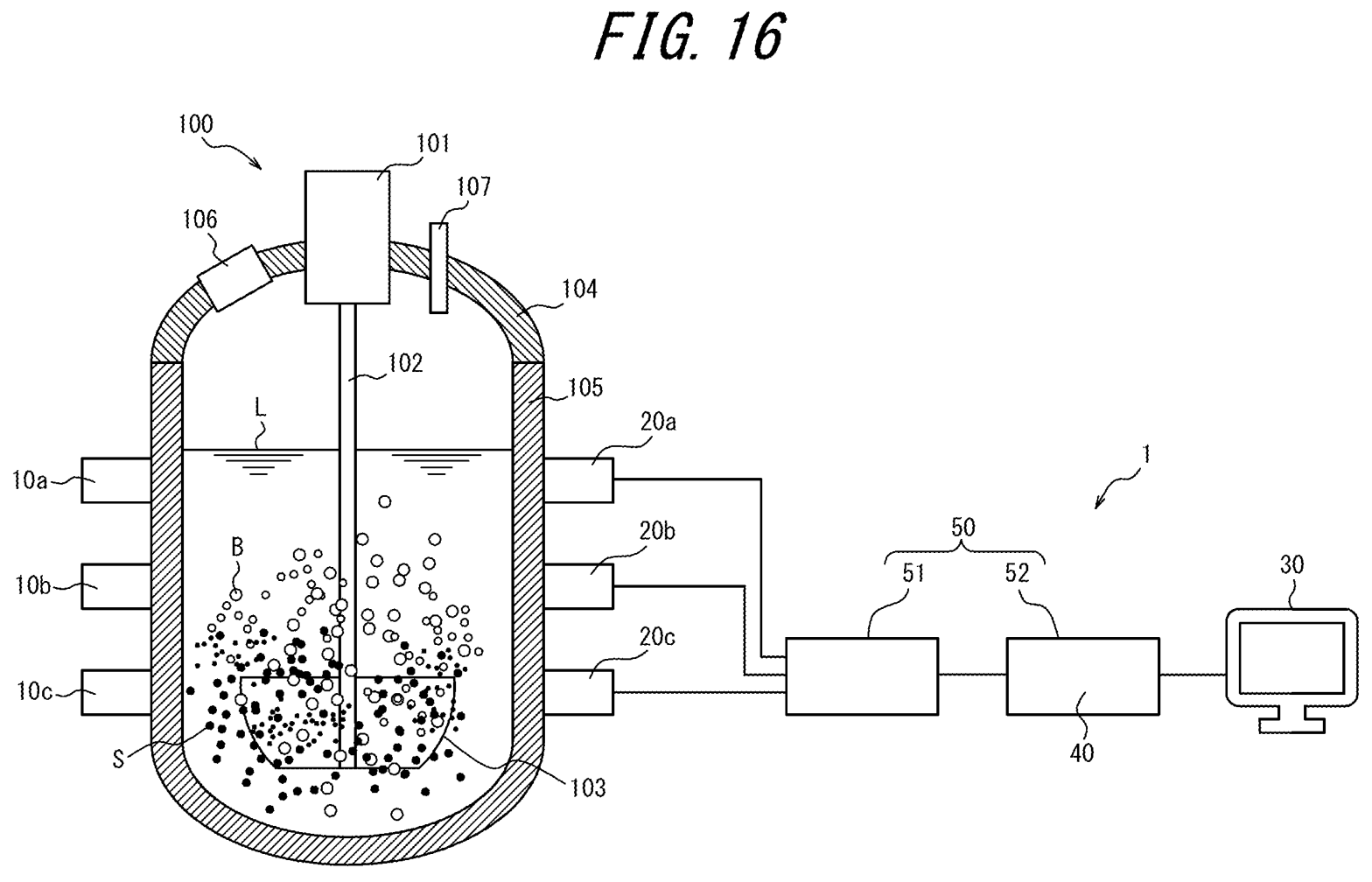

FIG. 16 is a schematic diagram illustrating Variation 1 of the measurement apparatus 1 illustrated in FIG. 1. In the example illustrated in FIG. 16, the outputs 10 and each corresponding one of the detectors 20 are configured as different modules from each other. Each output detector may include one output 10 and one detector 20 configured as different modules from each other.

The outputs 10 and the detectors 20 of each pair are described as being disposed in the same position as each other, as illustrated in FIG. 1, but configurations are not limited to this. The outputs 10 and the detectors 20 of each pair may be disposed separately from each other, as illustrated in FIG. 16. For example, the detector 20a, the detector 20b, and the detector 20c may be disposed along one side of the outer surface of the container 105. For example, the output 10a, the output 10b, and the output 10c may be disposed along another side of the outer surface of the container 105.

In such a case, a detection signal output from one of the detectors 20 includes a transmission signal instead of a reflection signal of the ultrasonic wave propagated in the liquid L. In other words, each of the detectors 20 detects the transmitted wave of the ultrasonic wave output from a paired one of the outputs 10. The measurement apparatus 1 is able to measure the state of the liquid L based on the same principle as the measurement method described above, even when the detection signal includes a transmission signal. However, the propagation time of ultrasonic waves propagating in the liquid L is halved.

Figure 17:
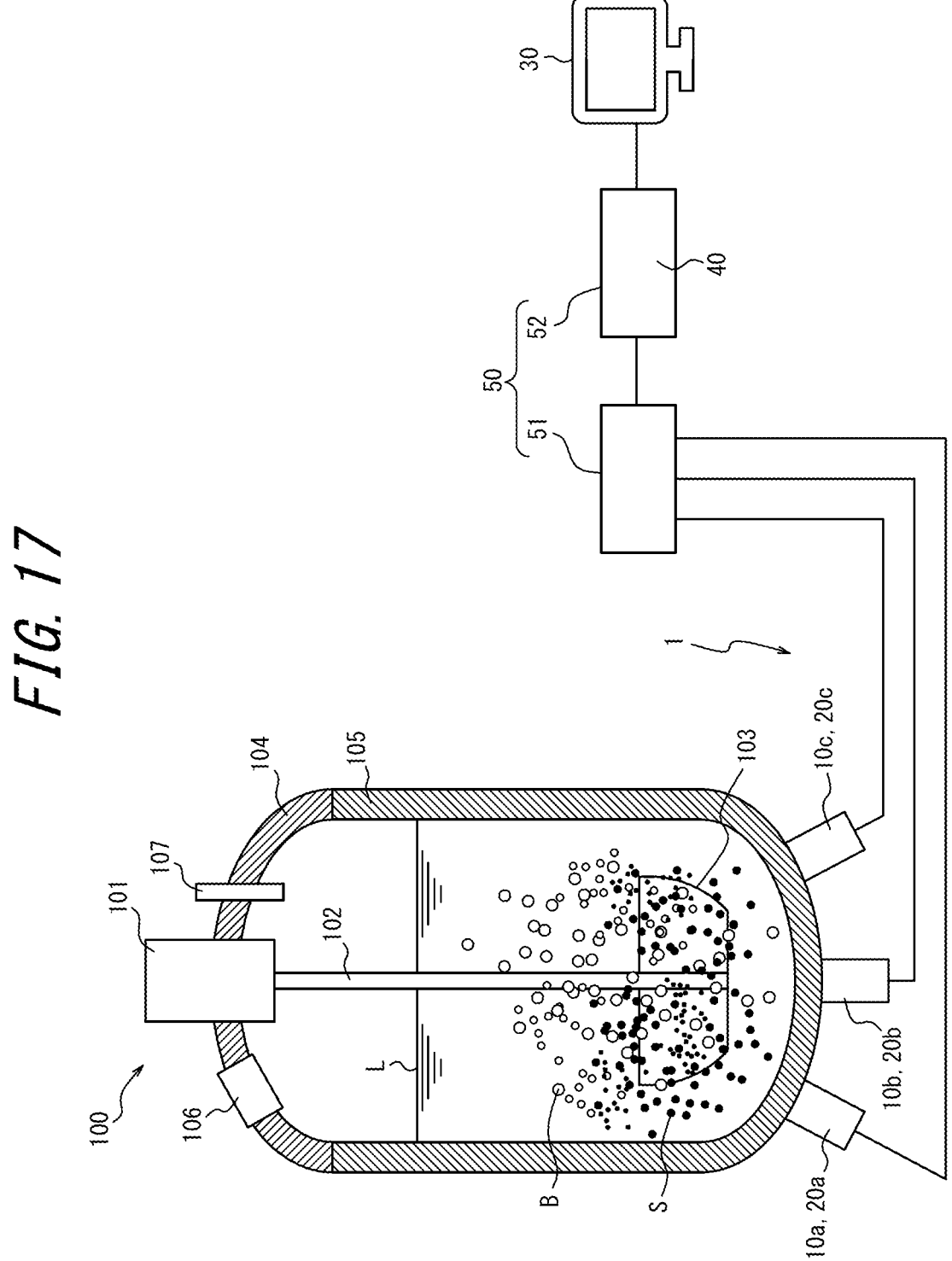
FIG. 17 is a schematic diagram illustrating Variation 2 of the measurement apparatus illustrated in FIG. 1.

FIG. 17 is a schematic diagram illustrating Variation 2 of the measurement apparatus 1 illustrated in FIG. 1.

The outputs 10 and the detectors 20 of each pair are described as being disposed on the side of the container 105 with respect to each other, as illustrated in FIG. 1, but configurations are not limited to this. Each pair of the outputs 10 and the detectors 20 may be disposed at the bottom of the container 105, as illustrated in FIG. 17.

In such a case, a detection signal output from one of the detectors 20 includes a reflection signal of an ultrasonic wave propagated in the liquid L, as described in the embodiment above. The measurement apparatus 1 is able to measure the state of the liquid L based on the same principle as the measurement method described above. However, the propagation time of ultrasonic waves propagating in the liquid L is different.

Figure 18:
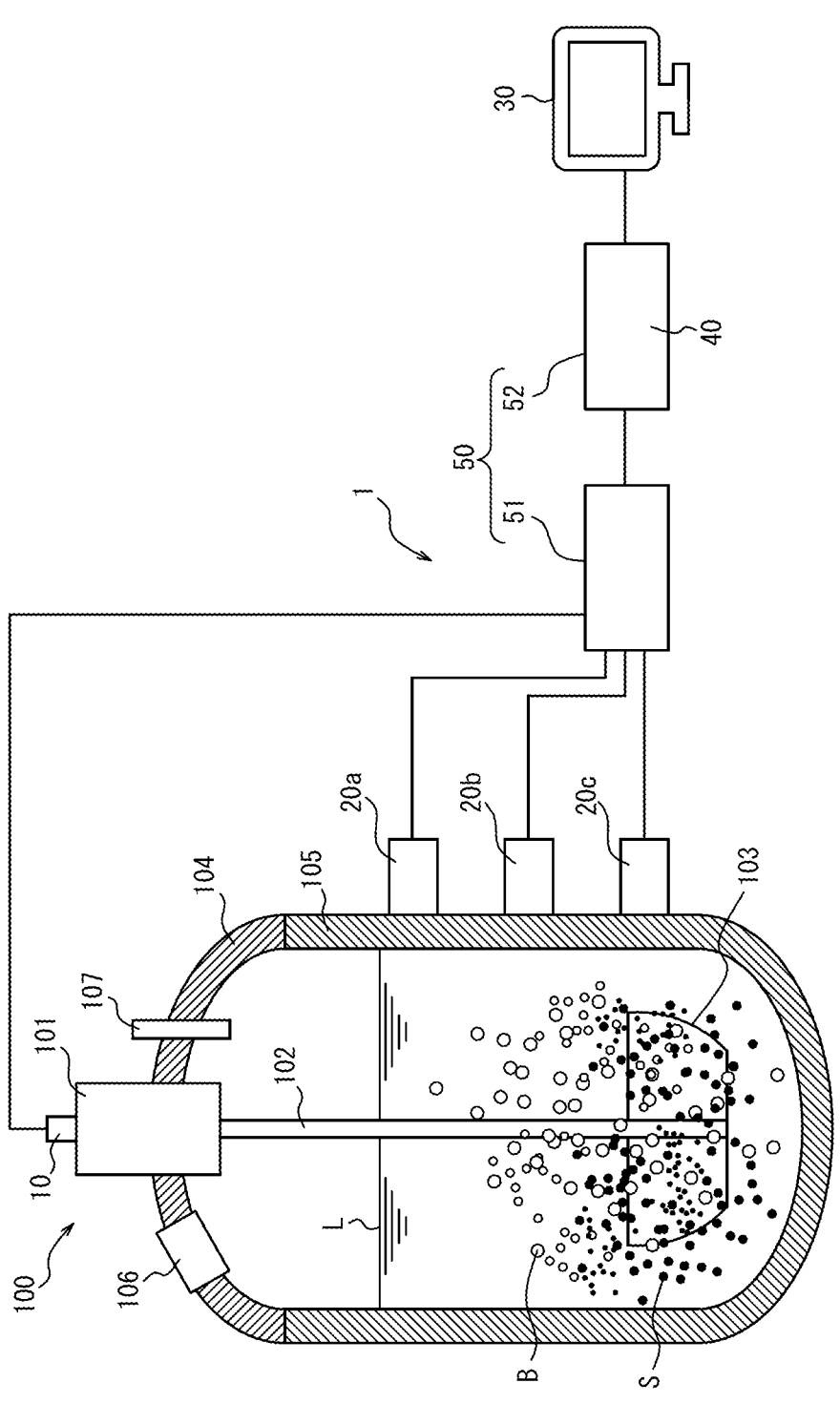
FIG. 18 is a schematic diagram illustrating Variation 3 of the measurement apparatus illustrated in FIG. 1.

FIG. 18 is a schematic diagram illustrating Variation 3 of the measurement apparatus 1 illustrated in FIG. 1.

The outputs 10 and the detectors 20 of each pair are described as being disposed in the same position as each other, as illustrated in FIG. 1, but configurations are not limited to this. As illustrated in FIG. 18, one output 10 may be disposed in a different position relative to the detectors 20. For example, the detector 20a, the detector 20b, and the detector 20c may be positioned along the side of the container 105. The output 10 may be attached to the motor 101, for example, and generate ultrasonic waves from inside the stirrer 100 via the stirring shaft 102.

In such a case, a detection signal output from one of the detectors 20 includes a transmission signal in addition to a reflection signal of the ultrasonic wave propagated in the liquid L. The measurement apparatus 1 is able to measure the state of the liquid L based on the same principle as the measurement method described above, even when the detection signal includes a reflection signal and a transmission signal. However, the propagation time of ultrasonic waves propagating in the liquid L is different.

Instead of or in addition to the stirrer 100, which is intended to disperse the object S in the liquid L, the measurement apparatus 1 described above may be applied to any other product that has measuring the state of the liquid L when stirred as a measurement target. For example, the measurement apparatus 1 may be applied to pumps, food manufacturing apparatus, depolymerization tanks, containers storing the liquid L, and the like.

Figure 19:
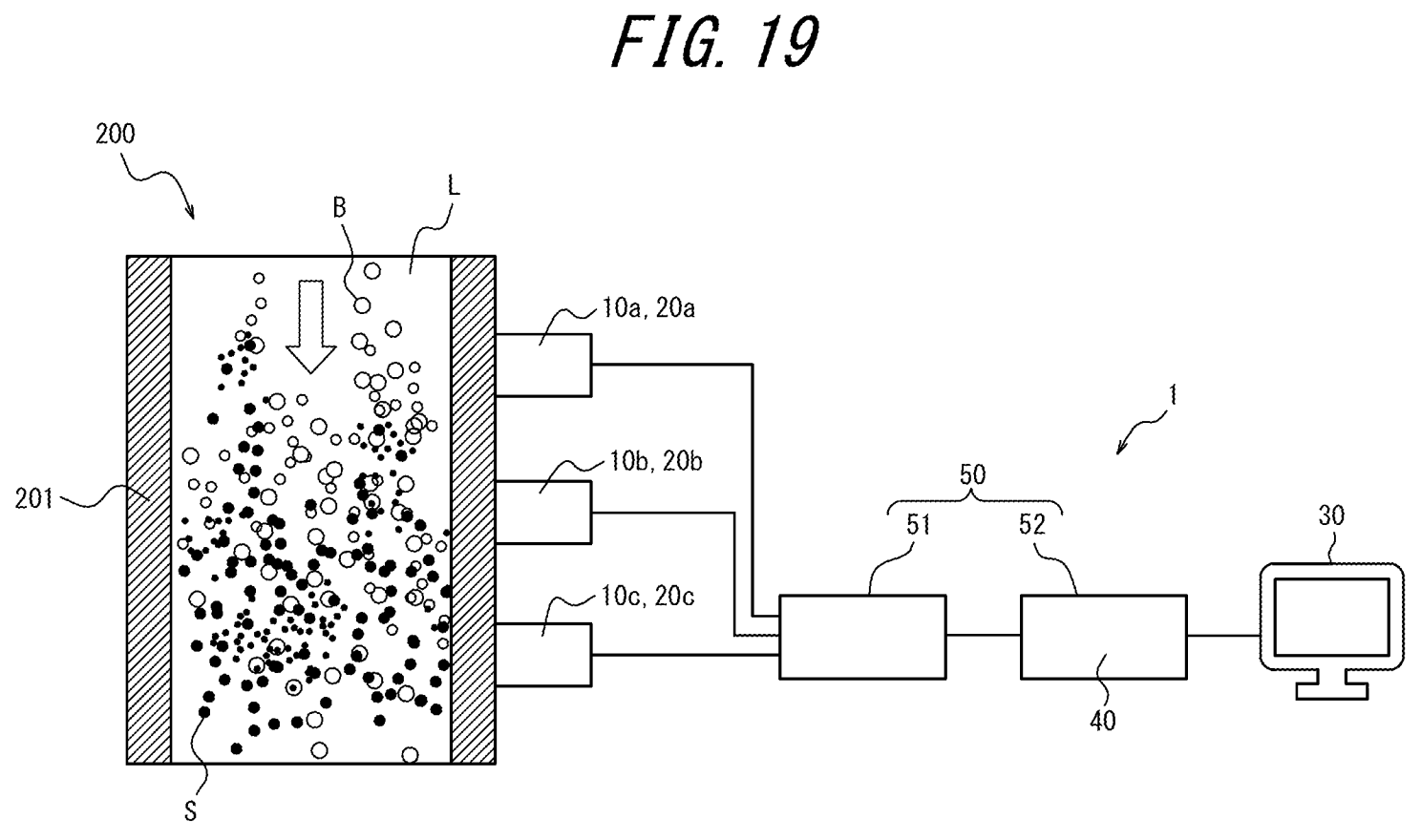

FIG. 19 is a schematic diagram illustrating Variation 4 of the measurement apparatus 1 illustrated in FIG. 1.

According to an embodiment, the measurement apparatus 1 is disposed relative to the container 105 of the stirrer 100 used to stir the object S in the liquid L, but the measurement apparatus 1 is not limited to this example. The measurement apparatus 1 may be disposed relative to a pipe 200 through which the liquid L flows in one direction, instead of the stirrer 100. For example, the measurement apparatus 1 may be disposed relative to a container 201 that constitutes a portion of the pipe 200. The pipe 200 may include round piping or square piping, for example.

According to Variation 4 illustrated in FIG. 19, as in the example illustrated in FIG. 1, one of the outputs 10 and one of the detectors 20 serve as one module, integrally configured as one output detector. One output detector includes one of the outputs 10 and one of the detectors 20. The output detector is fixed relative to the container 201.

Each of the outputs 10 includes any ultrasonic wave output module that is fixed to the container 201. Each of the outputs 10 outputs an ultrasonic wave that propagates in the liquid L flowing in one direction in the container 201. Each of the detectors 20 includes any ultrasonic wave detection module that is fixed to the container 201. Each of the detectors 20 detects an ultrasonic wave output from the outputs 10 and propagated in the liquid L flowing in one direction in the container 201.

The pairs of the outputs 10 and the detectors 20 of the measurement apparatus 1 are disposed along an outer surface of the container 201. The measurement apparatus 1 includes, for example, three pairs of the outputs 10 and the detectors 20. The output 10a and the detector 20a are disposed at an upper level along the outer surface of the container 201. The output 10b and the detector 20b are disposed at a middle level along the outer surface of the container 201. The output 10c and the detector 20c are disposed at a lower level along the outer surface of the container 201.

The principle of measuring the state of the liquid L by the controller 50 is the same as that described for the embodiment above. Detection signals output from the detectors 20 include reflection signals of ultrasonic waves propagated in the liquid L. The measurement apparatus 1 is able to measure the state of the liquid L based on the same principle as that of the measurement method described above when the detection signals include reflection signals. At such a time, the propagation times of ultrasonic waves propagating in the liquid L differ depending on the type of the liquid L. Accordingly, when the liquid L having different compositions is flowing, the measurement apparatus 1 is able to determine not only the state of the liquid L, but also the type of the liquid L, based on the propagation time of the ultrasonic waves.

Figure 20:
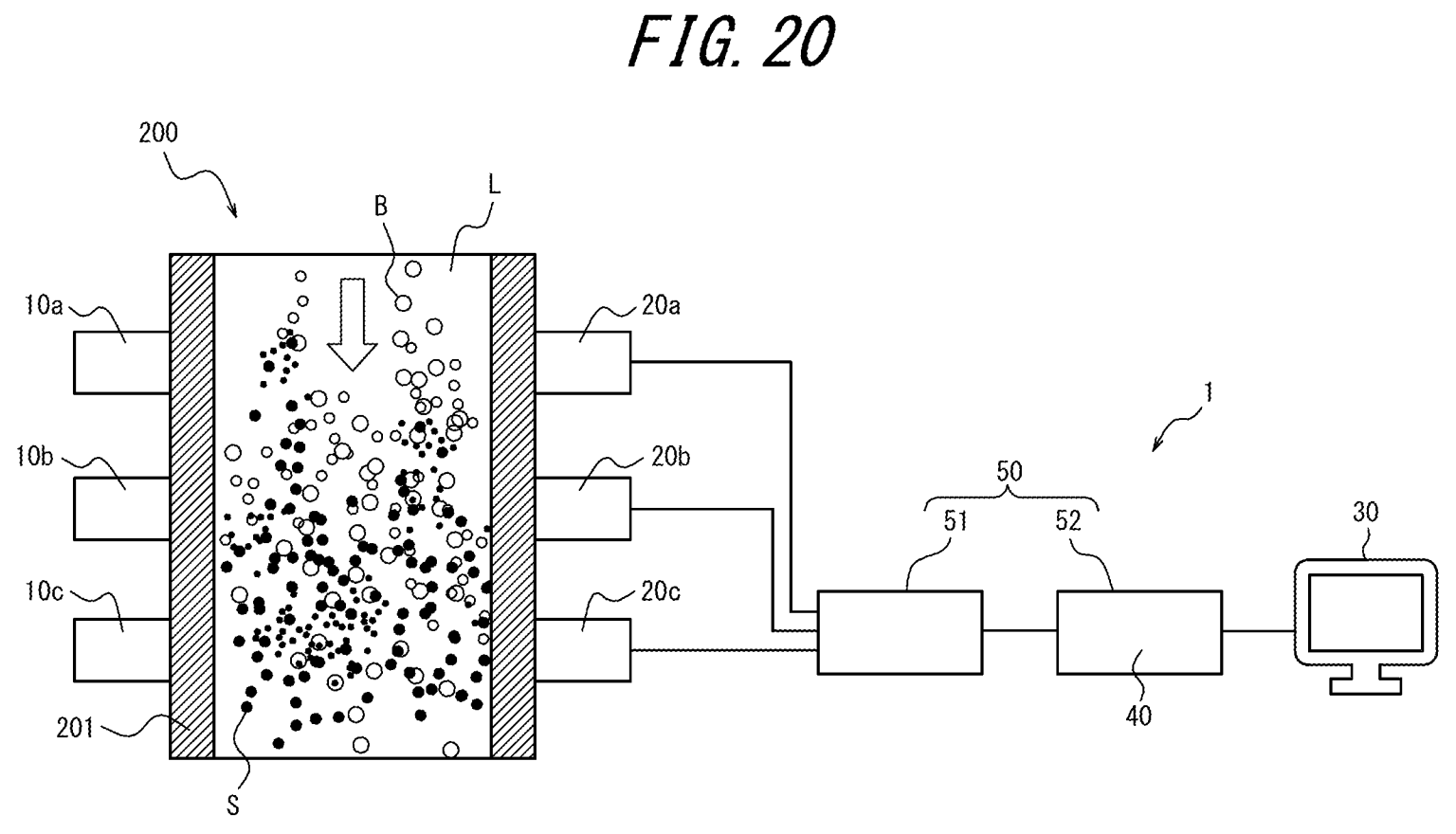

FIG. 20 is a schematic diagram illustrating Variation 5 of the measurement apparatus 1 illustrated in FIG. 1.

According to Variation 5 illustrated in FIG. 20, as in Variation 4 illustrated in FIG. 19, the measurement apparatus 1 is disposed relative to the pipe 200 through which the liquid L flows in one direction, instead of the stirrer 100. However, according to Variation 5 illustrated in FIG. 20, as in Variation 1 illustrated in FIG. 16, the outputs 10 and each corresponding one of the detectors 20 may be configured as different modules from each other. Each output detector may include one output 10 and one detector 20 configured as different modules from each other.

The outputs 10 and the detectors 20 of each pair may be disposed separately from each other, as illustrated in FIG. 20. For example, the detector 20a, the detector 20b, and the detector 20c may be disposed along one side of the outer surface of the container 201. For example, the output 10a, the output 10b, and the output 10c may be disposed along another side of the outer surface of the container 201.

In such a case, a detection signal output from one of the detectors 20 includes a transmission signal instead of a reflection signal of the ultrasonic wave propagated in the liquid L. In other words, each of the detectors 20 detects the transmitted wave of the ultrasonic wave output from a paired one of the outputs 10. The measurement apparatus 1 is able to measure the state of the liquid L based on the same principle as the measurement method described above, even when the detection signal includes a transmission signal. However, the propagation time of ultrasonic waves propagating in the liquid L is halved, relative to that of Variation 4 illustrated in FIG. 19.

At such a time, the propagation times of ultrasonic waves propagating in the liquid L differ depending on the type of the liquid L. Accordingly, when the liquid L having different compositions is flowing, the measurement apparatus 1 is able to determine not only the state of the liquid L, but also the type of the liquid L, based on the propagation time of the ultrasonic waves.

Figure 21:
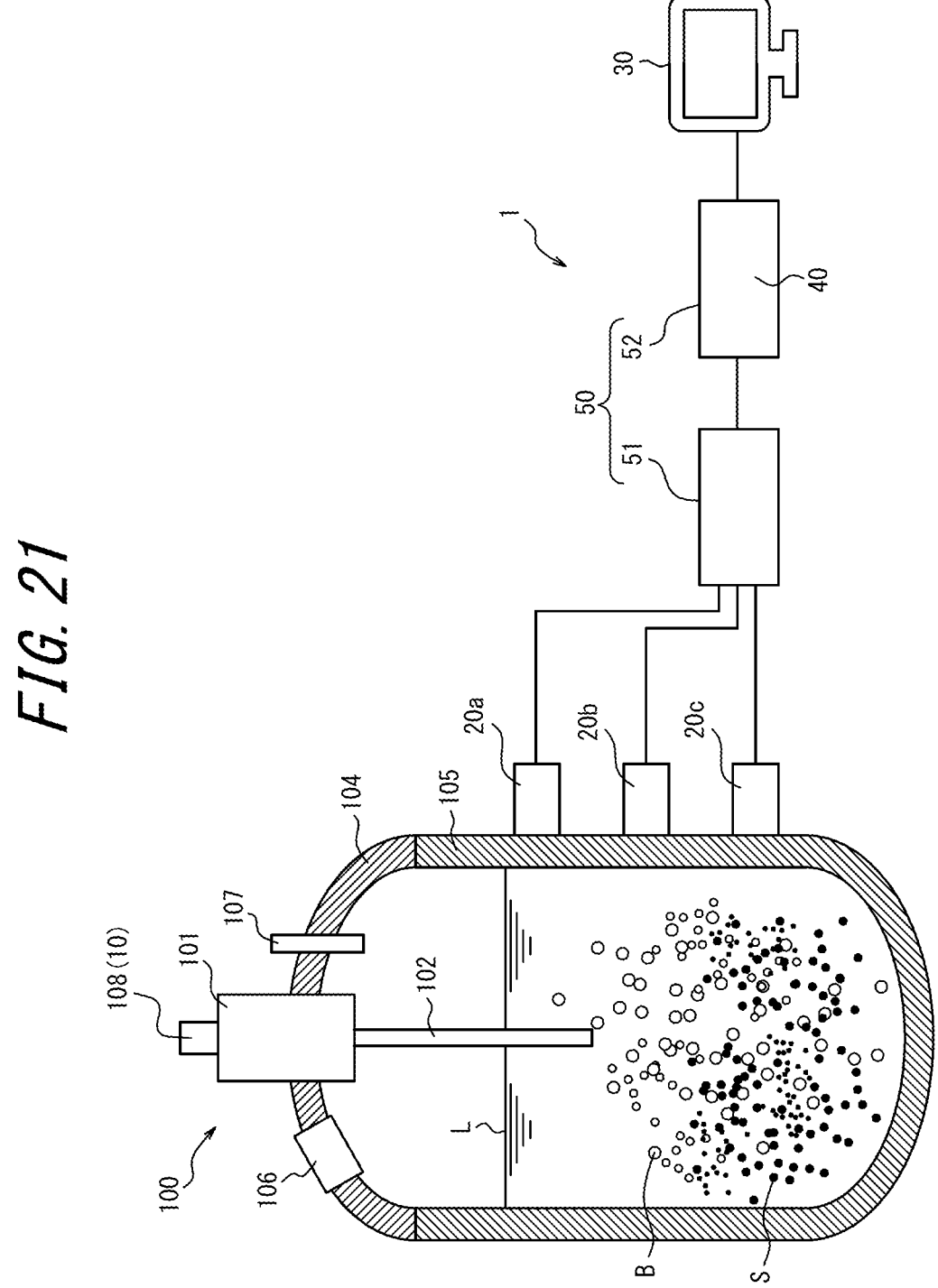
FIG. 21 is a schematic diagram illustrating Variation 6 of the measurement apparatus illustrated in FIG. 1.

FIG. 21 is a schematic diagram illustrating Variation 6 of the measurement apparatus 1 illustrated in FIG. 1.

According to Variation 6 illustrated in FIG. 21, the stirrer 100 may include a homogenizer 108 instead of the stirrer blade 103 illustrated in FIG. 1. The homogenizer 108 uses ultrasonic waves to disintegrate the object S in the liquid L in the container 105 and uniformly disperse the object S in the liquid L. Each of the output detectors may include the homogenizer 108 as the output 10. Each of the output detectors may detect ultrasonic waves from the homogenizer 108.

For example, the detector 20a, the detector 20b, and the detector 20c may be disposed along one side of the outer surface of the container 105. The output 10 may include, for example, the homogenizer 108 and generate ultrasonic waves from inside the stirrer 100 via the stirring shaft 102.

In such a case, a detection signal output from one of the detectors 20 includes a transmission signal as well as a reflection signal of an ultrasonic wave propagated in the liquid L from the homogenizer 108. The measurement apparatus 1 is able to measure the state of the liquid L based on the same principle as the measurement method described above, even when the detection signal includes a reflection signal and a transmission signal. However, the propagation times of ultrasonic waves propagating in the liquid L are different.

Figure 22:
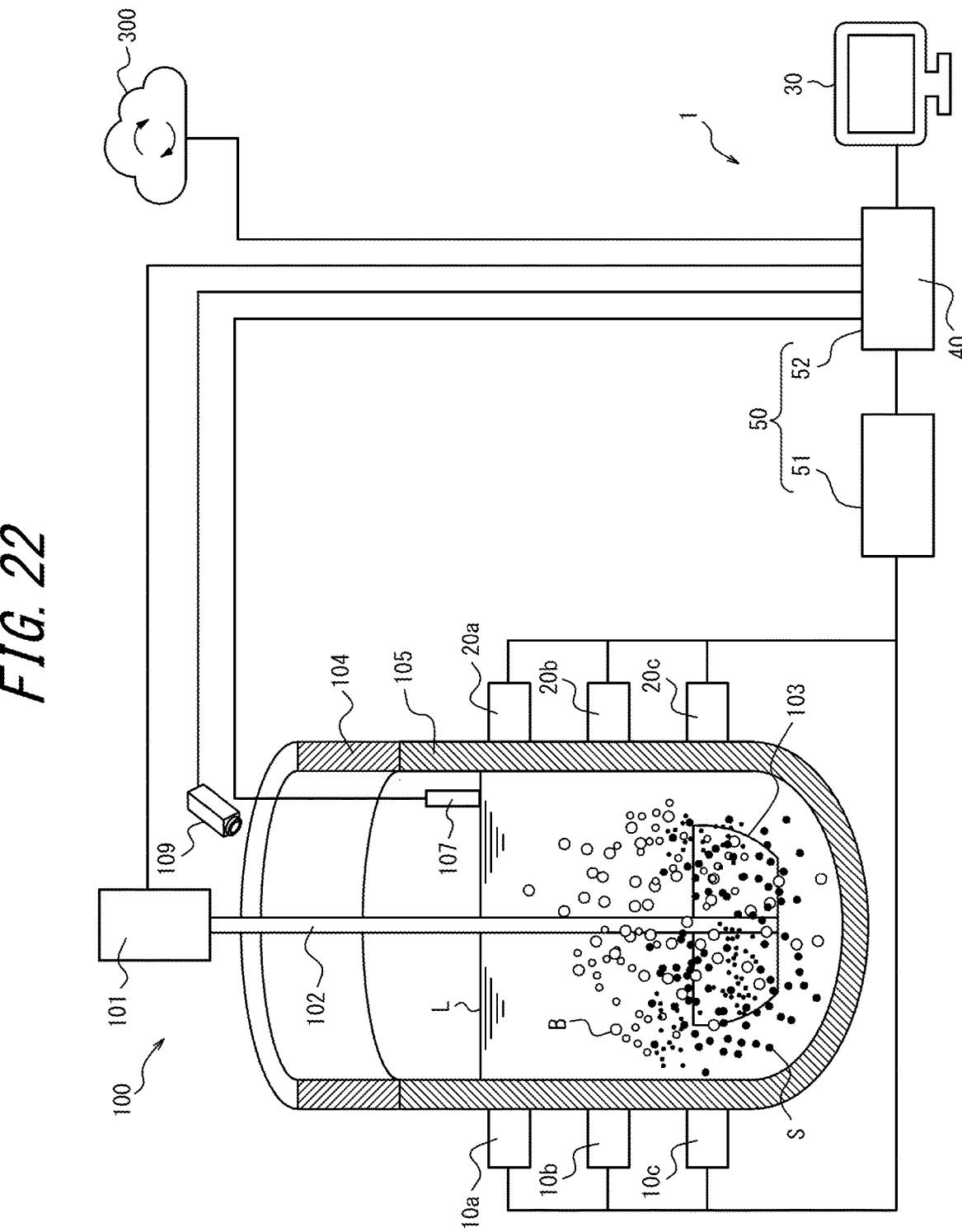
FIG. 22 is a schematic diagram illustrating Variation 7 of the measurement apparatus illustrated in FIG. 1.

FIG. 22 is a schematic diagram illustrating Variation 7 of the measurement apparatus illustrated in FIG. 1.

According to Variation 7 illustrated in FIG. 22, the outputs 10 and each corresponding one of the detectors 20 may be configured as different modules from each other. Each output detector may include one output 10 and one detector 20 configured as different modules from each other.

The outputs 10 and the detectors 20 of each pair may be disposed separately from each other, as illustrated in FIG. 22. For example, the detector 20a, the detector 20b, and the detector 20c may be disposed along one side of the outer surface of the container 105. For example, the output 10a, the output 10b, and the output 10c may be disposed along another side of the outer surface of the container 105.

In such a case, a detection signal output from one of the detectors 20 includes a transmission signal instead of a reflection signal of the ultrasonic wave propagated in the liquid L. In other words, each of the detectors 20 detects the transmitted wave of the ultrasonic wave output from a paired one of the outputs 10. The measurement apparatus 1 is able to measure the state of the liquid L based on the same principle as the measurement method described above, even when the detection signal includes a transmission signal.

In addition to the components illustrated in FIG. 1, the stirrer may further include a camera 109. The measurement instrument 107 of the stirrer 100 may include a sensor such as a thermometer, a pressure gauge, and the like. The controller 50 of the measurement apparatus 1 may measure, in addition to the state of the liquid L, at least one of the viscosity of the liquid L in the container 105, the pressure of the liquid L in the container 105, the temperature of the liquid L in the container 105, or the appearance of the liquid L in the container 105.

For example, the controller 50 may measure change in the viscosity of the liquid L in the container 105, based on change in axial force by the stirring shaft 102 and the stirrer blade 103 of the stirrer 100. The controller 50 may measure change in the pressure in the container 105 of the liquid L in the container 105, based on the measurement instrument 107. The controller 50 may measure change in the temperature in the container 105 of the liquid L in the container 105, based on the measurement instrument 107. The controller 50 may measure change in the appearance of the liquid L in the container 105, based on the camera 109. The controller 50 may upload measurement data obtained via measurements such as described above to a cloud network 300 or the like.

Figure 23:
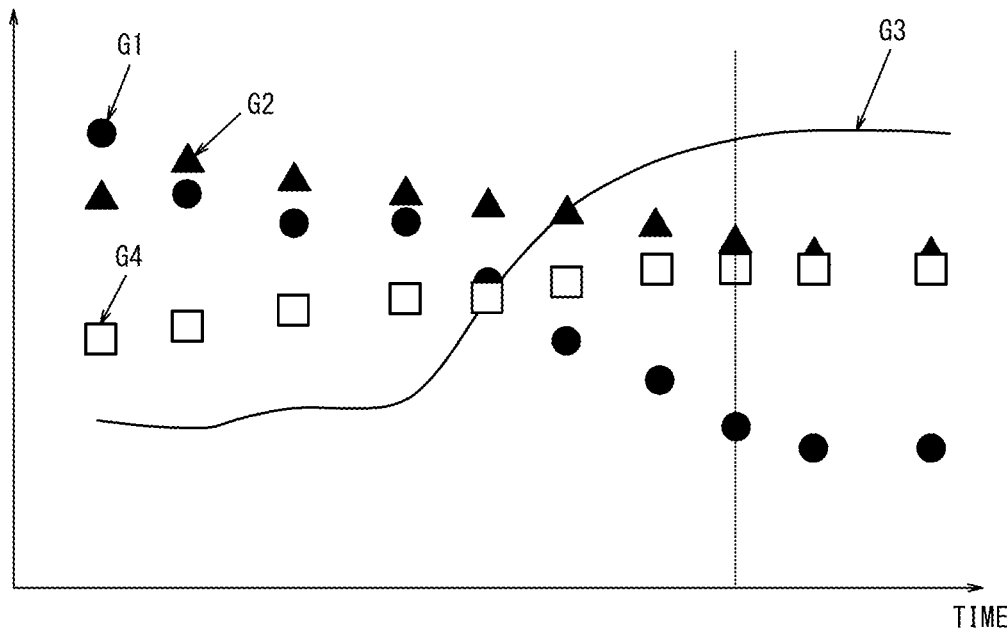
FIG. 23 is a graph illustrating an example of measurement data obtained by the measurement apparatus illustrated in FIG. 22.

FIG. 23 is a graph illustrating an example of measurement data obtained by the measurement apparatus 1 illustrated in FIG. 22.

In FIG. 23, a graph G1 indicates, as an example, the state of the liquid L measured by the measurement apparatus 1. For example, the graph G1 indicates the product state of the liquid L during stirring, that is, the degree of mixing of the object S with the liquid L. The graph G1 is not limited to this, and may indicate the speed, amplitude, and the like of ultrasound waves propagated in the liquid L.

A graph G2 indicates, as an example, the temperature in the container 105 of the liquid L measured by the measurement apparatus 1. A graph G3 indicates, as an example, the viscosity of the liquid L measured by the measurement apparatus 1. A graph G4 indicates, as an example, the pressure in the container 105 of the liquid L measured by the measurement apparatus 1.

By measuring multiple physical quantities at the same time as illustrated in FIG. 23, the measurement apparatus 1 is able to combine the multiple physical quantities and obtain a correlation thereof, thereby defining the state of the liquid L, for example the product state of the liquid L, with more precision. For example, in FIG. 23, the measurement apparatus 1 may be able to determine from convergence of changes in each graph that in a time region after the dotted line, the liquid L has a defined state and stirring of the object S into the liquid L is complete.

Some embodiments of the present disclosure are exemplified below. However, it should be noted that embodiments of the present disclosure are not limited to the examples below.

[Appendix 1]

A measurement apparatus disposed with respect to a container containing a liquid, the measurement apparatus comprising:

output detectors fixed to the container, the output detectors being configured to output ultrasonic waves that propagate in the liquid in the container and detect the ultrasonic waves propagated in the liquid; and a controller configured to measure a state of the liquid in the container based on the ultrasonic waves detected by the output detectors.

[Appendix 2]

The measurement apparatus according to appendix 1, wherein the container containing the liquid is for stirring an object in the liquid, the state of the liquid includes a product state of the liquid in stirring, and the controller is configured to measure the product state of the liquid based on reference data regarding the product state of the liquid in a first reference state and measurement data regarding the product state of the liquid in stirring.

[Appendix 3]

The measurement apparatus according to appendix 2, wherein the controller is configured to calculate a difference of the measurement data from the reference data and determine that the stirring of the object with respect to the liquid is complete when the difference is constant over a defined time.

[Appendix 4]

The measurement apparatus according to any one of appendices 1 to 3, wherein the state of the liquid includes a position of a liquid surface of the liquid in the container, and the controller is configured to measure the position of the liquid surface of the liquid based on detection signals of the ultrasonic waves detected by the output detectors.

[Appendix 5]

The measurement apparatus according to appendix 4, wherein the controller is configured to calculate a position between one of the output detectors that indicates a first detection signal and another adjacent one of the output detectors that indicates a second detection signal different from the first detection signal as the position of the liquid surface of the liquid.

[Appendix 6]

The measurement apparatus according to any one of appendices 1 to 5, wherein the state of the liquid includes presence or absence of bubbles or particles, and the controller is configured to measure the presence or absence of bubbles or particles based on at least one of a positive or negative beginning of a waveform and speed of sound of an ultrasonic wave detected by the output detectors.

[Appendix 7]

The measurement apparatus according to appendix 6, wherein the controller is configured to determine that bubbles are present when the positive or negative beginning of the waveform while the liquid is in use is inverted relative to the positive or negative beginning of a reference waveform while the liquid is in a second reference state.

[Appendix 8]

The measurement apparatus according to any one of appendices 1 to 7, wherein the state of the liquid includes density of bubbles or particles, and the controller is configured to measure the density of bubbles or particles based on the speed of sound of an ultrasonic wave detected by the output detectors.

[Appendix 9]

The measurement apparatus according to any one of appendices 1 to 8, wherein the output detectors are disposed along an outer surface of the container, and the output detectors are configured to detect a reflected or transmitted wave of the ultrasonic wave output.

[Appendix 10]

The measurement apparatus according to any one of appendices 1 to 9, wherein the output detectors include a homogenizer that uses the ultrasonic waves to disintegrate and disperse the object in the liquid, and the output detectors detect the ultrasonic waves from the homogenizer.

[Appendix 11]

The measurement apparatus according to any one of appendices 1 to 10, wherein the controller further measures at least one of the viscosity of the liquid in the container, the pressure of the liquid in the container, the temperature of the liquid in the container, or the appearance of the liquid in the container.

[Appendix 12]

A measurement method performed by a measurement apparatus disposed with respect to a container containing a liquid, the measurement method comprising:

outputting ultrasonic waves that propagate in the liquid in the container;

detecting, at a fixed position relative to the container, the ultrasonic waves propagated in the liquid; and measuring a state of the liquid in the container based on the ultrasonic waves detected.

The invention claimed is:

1. A measurement apparatus disposed with respect to a container containing a liquid for stirring an object in the liquid, the measurement apparatus comprising:

output detectors fixed to the container, the output detectors being configured to output ultrasonic waves that propagate in the liquid in the container and detect the ultrasonic waves propagated in the liquid; and a controller configured to measure a state of the liquid in the container based on the ultrasonic waves detected by the output detectors, wherein the state of the liquid includes a product state of the liquid in stirring, the controller is configured to measure the product state of the liquid based on reference data regarding the product state of the liquid in a first reference state and measurement data regarding the product state of the liquid in stirring, and the controller is configured to calculate a difference of the measurement data from the reference data and determine that the stirring of the object with respect to the liquid is complete when the difference is constant over a defined time.

2. The measurement apparatus according to claim 1, wherein the state of the liquid includes a position of a liquid surface of the liquid in the container, and the controller is configured to measure the position of the liquid surface of the liquid based on detection signals of the ultrasonic waves detected by the output detectors.

3. The measurement apparatus according to claim 2, wherein the controller is configured to calculate a position between one of the output detectors that indicates a first detection signal and another adjacent one of the output detectors that indicates a second detection signal different from the first detection signal as the position of the liquid surface of the liquid.

4. The measurement apparatus according to claim 1, wherein the state of the liquid includes presence or absence of bubbles or particles, and the controller is configured to measure the presence or absence of bubbles or particles based on at least one of a positive or negative beginning of a waveform and speed of sound of an ultrasonic wave detected by the output detectors.

5. The measurement apparatus according to claim 4, wherein the controller is configured to determine that bubbles are present when the positive or negative beginning of the waveform while the liquid is in use is inverted relative to the positive or negative beginning of a reference waveform while the liquid is in a second reference state.

6. The measurement apparatus according to claim 1, wherein the state of the liquid includes density of bubbles or particles, and the controller is configured to measure the density of bubbles or particles based on the speed of sound of an ultrasonic wave detected by the output detectors.

7. The measurement apparatus according to claim 1, wherein the output detectors are disposed along an outer surface of the container, and the output detectors are configured to detect a reflected or transmitted wave of the ultrasonic wave output.

8. The measurement apparatus according to claim 1, wherein the output detectors include a homogenizer that uses the ultrasonic waves to disintegrate and disperse the object in the liquid, and the output detectors detect the ultrasonic waves from the homogenizer.

9. The measurement apparatus according to claim 1, wherein the controller further measures at least one of the viscosity of the liquid in the container, the pressure of the liquid in the container, the temperature of the liquid in the container, or the appearance of the liquid in the container.

10. A measurement method performed by a measurement apparatus disposed with respect to a container containing a liquid for stirring an object in the liquid, the measurement method comprising:

outputting ultrasonic waves that propagate in the liquid in the container;

detecting, at a fixed position relative to the container, the ultrasonic waves propagated in the liquid; and measuring a state of the liquid in the container based on the ultrasonic waves detected, wherein the state of the liquid includes a product state of the liquid in stirring, the measuring further comprises measuring the product state of the liquid based on reference data regarding the product state of the liquid in a first reference state and measurement data regarding the product state of the liquid in stirring, and calculating a difference of the measurement data from the reference data and determining that the stirring of the object with respect to the liquid is complete when the difference is constant over a defined time.

11. A measurement apparatus disposed with respect to a container containing a liquid, the measurement apparatus comprising:

output detectors fixed to the container, the output detectors being configured to output ultrasonic waves that propagate in the liquid in the container and detect the ultrasonic waves propagated in the liquid; and a controller configured to measure a state of the liquid in the container based on the ultrasonic waves detected by the output detectors, wherein the state of the liquid includes presence or absence of bubbles or particles, and the controller is configured to measure the presence or absence of bubbles or particles based on at least one of a positive or negative beginning of a waveform and speed of sound of an ultrasonic wave detected by the output detectors, and the controller is configured to determine that bubbles are present when the positive or negative beginning of the waveform while the liquid is in use is inverted relative to the positive or negative beginning of a reference waveform while the liquid is in a second reference state.

* * * * *